(12) United States Patent
Gulati et al.

(10) Patent No.: US 11,585,889 B2
(45) Date of Patent: *Feb. 21, 2023

(54) METHODS FOR RADAR COEXISTENCE

(71) Applicant: QUALCOMM Incorporated, San Diego, CA (US)

(72) Inventors: Kapil Gulati, Hillsborough, NJ (US); Junyi Li, Chester, NJ (US); Sundar Subramanian, San Diego, CA (US); Jayakrishnan Unnikrishnan, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 16/512,267

(22) Filed: Jul. 15, 2019

(65) Prior Publication Data

US 2020/0033442 A1 Jan. 30, 2020

Related U.S. Application Data

(60) Provisional application No. 62/703,290, filed on Jul. 25, 2018.

(51) Int. Cl.
*G01S 7/02* (2006.01)
*G01S 7/288* (2006.01)
(Continued)

(52) U.S. Cl.
CPC ............ *G01S 7/023* (2013.01); *G01S 7/0232* (2021.05); *G01S 7/0233* (2021.05);
(Continued)

(58) Field of Classification Search
CPC ...... G01S 7/2883; G01S 7/356; G01S 7/4056; G01S 7/288; G01S 7/2921; G01S 7/2923;
(Continued)

(56) References Cited

U.S. PATENT DOCUMENTS 4,686,655 A * 8/1987 Hyatt ................. G02F 1/13318
708/3
6,321,602 B1 * 11/2001 Ben-Romdhane ...... F16C 19/52
340/679
(Continued)

FOREIGN PATENT DOCUMENTS

CN 107450064 A 12/2017
CN 107683423 A 2/2018
(Continued)

OTHER PUBLICATIONS

International Search Report and Written Opinion—PCT/US2019/042038—ISA/EPO—dated Dec. 3, 2019.
(Continued)

*Primary Examiner* — Erin F Heard
*Assistant Examiner* — Michael W Justice
(74) *Attorney, Agent, or Firm* — Danai Nelisile Mhembere; Holland & Hart LLP

(57) ABSTRACT

A method and apparatus for selecting frequency modulated continuous wave waveform parameters for multiple radar coexistence by a user equipment is described. The user equipment may transmit a radar waveform consisting of a number of chirps, with each chirp having a same duration. The user equipment may vary waveform parameters of the radar waveform for at least a subset of the number of chirp, where the waveform parameters may be chosen from a codebook comprising at least one codeword of parameters. Reflected radar waveforms are received and processed where the processing includes applying a fast time discrete Fourier transform to reflected radar waveforms to produce a one dimension peak in a time delay dimension for each reflected waveform; and applying a slow time discrete Fourier transform to the reflected radar waveforms, where peaks for the reflected waveforms are added.

30 Claims, 17 Drawing Sheets

(51) Int. Cl.
  *G01S 7/292* (2006.01)
  *G01S 13/36* (2006.01)
  *H04J 13/00* (2011.01)
(52) U.S. Cl.
  CPC ............ *G01S 7/0234* (2021.05); *G01S 7/288* (2013.01); *G01S 7/2921* (2013.01); *G01S 13/36* (2013.01); *H04J 13/0062* (2013.01); *G01S 7/2883* (2021.05)
(58) Field of Classification Search
  CPC .......... G01S 13/36; G01S 13/38; G01S 13/40; G01S 13/343; G01S 13/345; G01S 13/18
  USPC .................. 342/70, 342, 196, 200, 201, 202
  See application file for complete search history.

(56) References Cited

U.S. PATENT DOCUMENTS

| | | | | |
|---|---|---|---|---|
| 6,683,557 | B2 * | 1/2004 | Pleva | H01Q 3/24 342/28 |
| 6,707,419 | B2 | 3/2004 | Woodington et al. | |
| 6,816,107 | B2 * | 11/2004 | Pleva | H01Q 25/00 342/28 |
| 6,977,609 | B2 * | 12/2005 | Pleva | G01S 7/354 342/28 |
| 8,130,857 | B2 * | 3/2012 | Kim | H04L 25/0204 375/267 |
| 8,314,732 | B2 * | 11/2012 | Oswald | G01S 7/2926 342/195 |
| 8,351,455 | B2 | 1/2013 | Tang et al. | |
| 8,742,975 | B2 * | 6/2014 | Gravelle | G01S 13/751 342/42 |
| 8,848,827 | B2 * | 9/2014 | Hiscock | H04L 1/0002 455/39 |
| 9,225,452 | B2 * | 12/2015 | Kim | H04J 3/00 |
| 9,841,498 | B1 | 12/2017 | Campbell et al. | |
| 10,048,353 | B2 * | 8/2018 | Vogt | G01S 13/325 |
| 10,082,562 | B1 * | 9/2018 | Abari | G01S 13/325 |
| 10,451,723 | B2 * | 10/2019 | Chiu | G01S 7/354 |
| 10,620,297 | B2 * | 4/2020 | Cohen | G01S 7/006 |
| 10,718,860 | B2 * | 7/2020 | Santra | G01S 13/584 |
| 10,736,134 | B2 | 8/2020 | Lee et al. | |
| 10,855,328 | B1 * | 12/2020 | Gulati | G01S 7/0232 |
| 11,073,598 | B2 * | 7/2021 | Gulati | H04B 7/0456 |
| 2003/0210172 | A1 * | 11/2003 | Pleva | G01S 13/584 342/70 |
| 2004/0155812 | A1 * | 8/2004 | Pleva | G01S 13/282 342/28 |
| 2004/0257266 | A1 * | 12/2004 | Pleva | G01S 13/346 342/27 |
| 2006/0125682 | A1 | 6/2006 | Kelly, Jr. et al. | |
| 2006/0222098 | A1 * | 10/2006 | Sedarat | H04L 5/006 375/260 |
| 2008/0037669 | A1 | 2/2008 | Pan et al. | |
| 2008/0177886 | A1 | 7/2008 | Singh et al. | |
| 2008/0310354 | A1 | 12/2008 | Hansen et al. | |
| 2009/0285264 | A1 * | 11/2009 | Aldana | H04B 1/1027 375/139 |
| 2010/0226343 | A1 | 9/2010 | Hsu et al. | |
| 2011/0122014 | A1 | 5/2011 | Szajnowski | |
| 2011/0170427 | A1 | 7/2011 | Koivisto et al. | |
| 2012/0200743 | A1 | 8/2012 | Blanchflower et al. | |
| 2012/0300810 | A1 * | 11/2012 | Hiscock | H04L 1/0002 375/139 |
| 2016/0054441 | A1 | 2/2016 | Kuo et al. | |
| 2016/0124075 | A1 * | 5/2016 | Vogt | G01S 13/343 342/13 |
| 2016/0146933 | A1 | 5/2016 | Rao et al. | |
| 2016/0187462 | A1 | 6/2016 | Altus et al. | |
| 2016/0223643 | A1 | 8/2016 | Li et al. | |
| 2016/0327633 | A1 | 11/2016 | Kumar et al. | |
| 2017/0195033 | A1 | 7/2017 | Zhang et al. | |
| 2017/0219689 | A1 * | 8/2017 | Hung | G01S 7/0233 |
| 2017/0363712 | A1 | 12/2017 | Kim | |
| 2017/0371028 | A1 | 12/2017 | Laifenfeld et al. | |
| 2018/0048493 | A1 | 2/2018 | Bordes et al. | |
| 2018/0059213 | A1 | 3/2018 | Wallstedt et al. | |
| 2018/0102877 | A1 | 4/2018 | Jiang et al. | |
| 2018/0113191 | A1 | 4/2018 | Villeval et al. | |
| 2018/0145855 | A1 | 5/2018 | Chaudhuri et al. | |
| 2018/0172816 | A1 * | 6/2018 | Chiu | G01S 13/26 |
| 2018/0199377 | A1 * | 7/2018 | Sanderovich | H04W 74/0816 |
| 2018/0248596 | A1 | 8/2018 | Xiao et al. | |
| 2019/0056488 | A1 | 2/2019 | Vacanti et al. | |
| 2019/0086528 | A1 * | 3/2019 | Steiner | F04D 29/661 |
| 2019/0212428 | A1 * | 7/2019 | Santra | H03L 7/06 |
| 2019/0219683 | A1 * | 7/2019 | Fang | G01S 7/35 |
| 2019/0265346 | A1 * | 8/2019 | Hakobyan | G01S 13/347 |
| 2019/0293748 | A1 * | 9/2019 | Gulati | G01S 7/4004 |
| 2019/0369204 | A1 | 12/2019 | Kim et al. | |
| 2019/0383925 | A1 * | 12/2019 | Gulati | G01S 13/341 |
| 2019/0391247 | A1 * | 12/2019 | Gulati | G01S 7/0232 |
| 2020/0025865 | A1 * | 1/2020 | Gulati | H04L 7/06 |
| 2020/0025866 | A1 * | 1/2020 | Gulati | G01S 7/0231 |
| 2020/0028656 | A1 * | 1/2020 | Gulati | G01S 7/006 |
| 2020/0033442 | A1 * | 1/2020 | Gulati | G01S 7/0234 |
| 2020/0132825 | A1 * | 4/2020 | Jungmaier | G01S 7/023 |
| 2020/0233076 | A1 * | 7/2020 | Chen | G01S 7/4865 |
| 2020/0300996 | A1 * | 9/2020 | Cetinoneri | G01S 7/006 |
| 2020/0351883 | A1 | 11/2020 | Wu et al. | |
| 2021/0096234 | A1 * | 4/2021 | Gulati | G01S 13/325 |
| 2021/0195435 | A1 * | 6/2021 | Rimini | H04W 16/28 |

FOREIGN PATENT DOCUMENTS

EP 2390679 A1 11/2011
WO WO-2017128275 A1 8/2017

OTHER PUBLICATIONS

Partial International Search Report—PCT/US2019/042038—ISA/EPO—dated Oct. 8, 2019.

* cited by examiner

METHODS FOR RADAR COEXISTENCE

CROSS REFERENCES

The present application for patent claims the benefit of U.S. Provisional Patent Application No. 62/703,290 by Gulati, et al., entitled "Methods for Radar Coexistence," filed Jul. 25, 2018, assigned to the assignee hereof, and expressly incorporated by reference herein.

INTRODUCTION

The following relates generally to selecting waveform parameters for multiple radar coexistence and processing the reflected radar waveforms by equalizing and resampling reflected radar waveforms.

Radar systems are used for target detection by transmitting radio frequency waveforms and observing the reflected received waveform from the target to estimate the properties of the target such as distance, speed, and angular location of the target. Radar systems are widely used for detection of aircrafts, ships, vehicles, weather formations, terrains, etc. Examples of the transmitted radio frequency waveforms used in radar systems may include frequency modulated continuous waves (FMCWs), phase modulated continuous waves (PMCWs), etc.

Radar may be used in vehicles as a sensor input to enable advanced driver assistance systems (ADAS) and automated driving. Radar transmissions from nearby vehicles, however, may generate significant interference for other radar systems and may degrade target detection performance.

SUMMARY

The present disclosure relates to methods, systems, devices, and apparatuses for selecting frequency modulated continuous wave waveform parameters for multiple radar coexistence. A method for selecting waveform parameters for multiple radar coexistence by a user equipment (UE) is described. In one example, the method, and apparatus may include the UE transmitting a radar waveform consisting of a number of chirps, where each chirp has a same duration. The UE may vary waveform parameters of the radar waveform for at least a subset of the number of chirps, where the waveform parameters are chosen from a codebook including at least one codeword of parameters. The UE may then receive and process the reflected radar waveform.

A method of detecting a target using radar signals implemented by a UE is described. The method may include selecting, from a codebook of waveform parameters, a set of waveform parameters for transmitting a corresponding set of chirps associated with a radar waveform, transmitting the set of chirps according to the corresponding set of waveform parameters, receiving a reflected radar waveform from the target including a set of reflected chirps corresponding to the set of chirps, and processing the reflected radar waveform based on the set of waveform parameters.

An apparatus for detecting a target using radar signals implemented by a UE is described. The apparatus may include a processor, memory coupled to the processor, and instructions stored in the memory. The instructions may be executable by the processor to cause the apparatus to select, from a codebook of waveform parameters, a set of waveform parameters for transmitting a corresponding set of chirps associated with a radar waveform, transmit the set of chirps according to the corresponding set of waveform parameters, receive a reflected radar waveform from the target including a set of reflected chirps corresponding to the set of chirps, and process the reflected radar waveform based on the set of waveform parameters.

Another apparatus for detecting a target using radar signals implemented by a UE is described. The apparatus may include means for selecting, from a codebook of waveform parameters, a set of waveform parameters for transmitting a corresponding set of chirps associated with a radar waveform, transmitting the set of chirps according to the corresponding set of waveform parameters, receiving a reflected radar waveform from the target including a set of reflected chirps corresponding to the set of chirps, and processing the reflected radar waveform based on the set of waveform parameters.

A non-transitory computer-readable medium storing code for detecting a target using radar signals implemented by a UE is described. The code may include instructions executable by a processor to select, from a codebook of waveform parameters, a set of waveform parameters for transmitting a corresponding set of chirps associated with a radar waveform, transmit the set of chirps according to the corresponding set of waveform parameters, receive a reflected radar waveform from the target including a set of reflected chirps corresponding to the set of chirps, and process the reflected radar waveform based on the set of waveform parameters.

In one example of the method, apparatuses, and non-transitory computer-readable medium described herein, the set of waveform parameters includes at least three different waveform parameters.

In one example of the method, apparatuses, and non-transitory computer-readable medium described herein, the selecting the set of waveform parameters from the codebook includes randomly selecting the set of waveform parameters from the codebook.

In one example of the method, apparatuses, and non-transitory computer-readable medium described herein, the set of waveform parameters includes a set of pairs of waveform parameters, each pair of waveform parameters including a chirp slope and a frequency offset.

In one example of the method, apparatuses, and non-transitory computer-readable medium described herein, the transmitting the set of chirps according to the set of waveform parameters includes transmitting each chirp of the set of chirps according to a different pair of waveform parameters than the preceding chirp.

Some examples of the method, apparatuses, and non-transitory computer-readable medium described herein may further include operations, features, means, or instructions for transmitting a first chirp of the set of chirps according to a first pair of waveform parameters of the set of waveform parameters, and transmitting, consecutively to the first chirp, a second chirp of the set of chirps according to a second pair of waveform parameters of the set of waveform parameters different than the first pair of waveform parameters.

Some examples of the method, apparatuses, and non-transitory computer-readable medium described herein may further include operations, features, means, or instructions for transmitting a third chirp of the set of chirps according to a third pair of waveform parameters of the set of waveform parameters different than the second pair of waveform parameters.

In one example of the method, apparatuses, and non-transitory computer-readable medium described herein, the transmitting the third chirp includes transmitting the third chirp consecutively to the second chirp.

In one example of the method, apparatuses, and non-transitory computer-readable medium described herein, each chirp slope depends on a corresponding first parameter and each frequency offset depends on the corresponding first parameter and a corresponding second parameter.

Some examples of the method, apparatuses, and non-transitory computer-readable medium described herein may further include operations, features, means, or instructions where each pair of waveform parameters satisfies the following parameterization relationship:

$$\text{Parameters: } (\beta^{(m)}, f_0^{(m)}) = \left( u^{(m)} \frac{B}{T_c}, u^{(m)} \frac{(1 + 2q^{(m)})}{T_c} \right)$$

where $\beta^{(m)}$ is the chirp slope, $f_0^{(m)}$ is the frequency offset, $q^{(m)}$ is the first parameter, $u^{(m)}$ is the second parameter, B is a frequency range of each chirp of the set of chirps, and Tc is a time period of each chirp of the set of chirps.

Some examples of the method, apparatuses, and non-transitory computer-readable medium described herein may further include operations, features, means, or instructions where BTc may be a prime number.

Some examples of the method, apparatuses, and non-transitory computer-readable medium described herein may further include operations, features, means, or instructions for applying a phase modulation to two or more chirps of the set of chirps before transmitting the two or more chirps to reduce coherent addition of chirps of the set of chirps transmitted according to a same pair of waveform parameters.

In one example of the method, apparatuses, and non-transitory computer-readable medium described herein, each chirp of the set of chirps corresponds to a cycle of the radar waveform having a same constant time period Tc.

In one example of the method, apparatuses, and non-transitory computer-readable medium described herein, each reflected chirp of the set of reflected chirps corresponds to a transmitted chirp of the set of chirps and may be associated with a same waveform parameter as the corresponding transmitted chirp, and where the processing the reflected radar waveform may include operations, features, means, or instructions for identifying, based on a first reflected chirp associated with a first waveform parameter of the set of waveform parameters, a peak in a time delay dimension corresponding to a distance of the target, and identifying, based on the first reflected chirp and a second reflected chirp associated with a second waveform parameter of the set of waveform parameters, a peak in a Doppler dimension corresponding to the doppler of the target.

In one example of the method, apparatuses, and non-transitory computer-readable medium described herein, the processing the reflected radar waveform may include operations, features, means, or instructions for applying a first Fourier transform to the first reflected chirp to identify the peak in the time delay dimension, and applying a second Fourier transform to the first reflected chirp and the second reflected chirp to identify the peak in the Doppler dimension.

In one example of the method, apparatuses, and non-transitory computer-readable medium described herein, the processing the reflected radar waveform may include operations, features, means, or instructions for applying a third Fourier transform to the second reflected chirp and equalizing a first phase of the first reflected chirp and a second phase of the second reflected chirp before applying the second Fourier transform.

In one example of the method, apparatuses, and non-transitory computer-readable medium described herein, the processing the reflected radar wave form may include operations, features, means, or instructions for resampling the first reflected chirp and second reflected chirp after applying the first Fourier transform and third Fourier transform to align outputs of the first Fourier transform and third Fourier transform before applying the second Fourier transform.

In one example of the method, apparatuses, and non-transitory computer-readable medium described herein, the radar waveform may be a frequency modulated continuous wave (FMCW) waveform.

In one example of the method, apparatuses, and non-transitory computer-readable medium described herein, the radar waveform may be a phase-coded frequency modulated continuous wave (FMCW) waveform.

BRIEF DESCRIPTION OF THE DRAWINGS

FIG. 7A illustrates unvaried waveform parameters, while FIG. 7B illustrates variations in the slope and/or the frequency offset f parameters.

DETAILED DESCRIPTION

Figure 1:
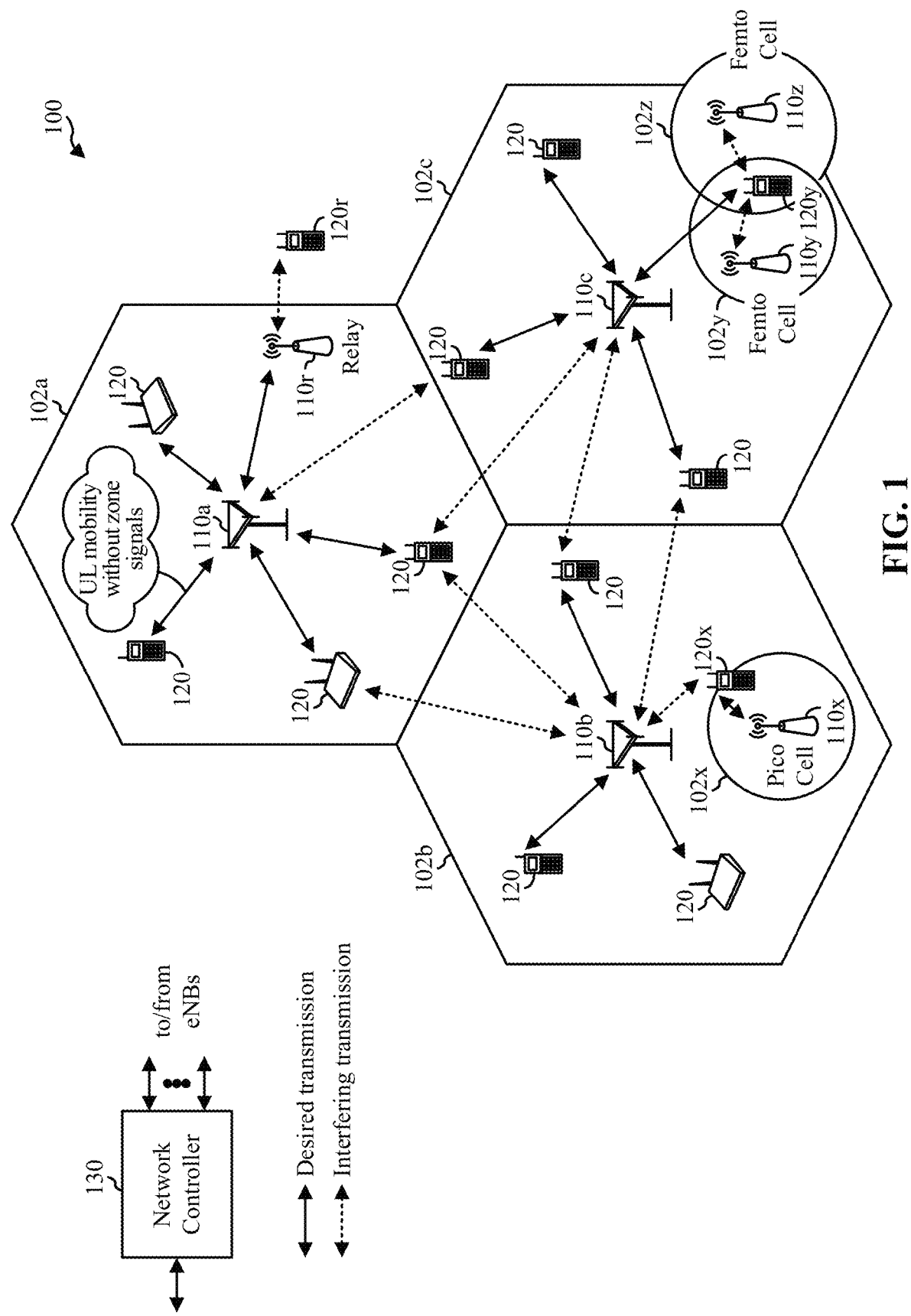
FIG. 1 illustrates an example wireless network in accordance with aspects of the present disclosure.

In some wireless communications systems, such as 5th Generation (5G) New Radio (NR) systems, transmission waveforms may include cyclic prefix orthogonal frequency division multiplexing (CP-OFDM) and discrete Fourier transform-spread (DFT-S) OFDM. 5G allows for switching between both CP-OFDM and DFT-S-OFDM on the uplink (UL) to get the multiple input multiple output (MIMO) spatial multiplexing benefit of CP-OFDM and the link budget benefit of DFT-S-OFDM. With Long Term Evolution (LTE), orthogonal frequency division multiple access (OFDMA) communication signals may be used for downlink (DL) communications, while single-carrier frequency division multiple access (SC-FDMA) communication signals may be used for LTE UL communications. The DFT-s-OFDMA scheme spreads a set of data symbols (i.e., a data symbol sequence) over a frequency domain which is different from the OFDMA scheme. Also, in comparison to the OFDMA scheme, the DFT-s-OFDMA scheme can greatly reduce the peak to average power ratio (PAPR) of a transmission signal. The DFT-s-OFDMA scheme may also be referred to as an SC-FDMA scheme.

Scalable OFDM multi-tone numerology is another feature of 5G. Prior versions of LTE supported a mostly fixed OFDM numerology of 15 kilohertz (kHz) spacing between OFDM tones (often called subcarriers) and carrier bandwidths up to 20 megahertz (MHz). Scalable OFDM numerology has been introduced in 5G to support diverse spectrum bands/types and deployment models. For example, 5G NR is able to operate in millimeter wave (mmW) bands that have wider channel widths (e.g., hundreds of MHz) than bands in use in LTE. Also, the OFDM subcarrier spacing may scale with the channel width, so the fast Fourier transform (FFT) size may also scale such that the processing complexity does not increase unnecessarily for wider bandwidths. In the present application, numerology may refer to the different values that different features (e.g., subcarrier spacing, cyclic prefix (CP), symbol length, FFT size, transmission time interval (TTI), etc.) of a communication system can take.

Also in 5G NR, cellular technologies have been expanded into the unlicensed spectrum (e.g., both stand-alone and licensed-assisted access (LAA)). In addition, the unlicensed spectrum may occupy frequencies up to 60 gigahertz (GHz), also known as mmW. The use of unlicensed bands provides added capacity for communications in the system.

A first member of this technology family is referred to as LTE Unlicensed (LTE-U). By aggregating LTE in unlicensed spectrum with an 'anchor' channel in licensed spectrum, faster downloads are enabled for customers. Also, LTE-U may share the unlicensed spectrum fairly with Wi-Fi. This is an advantage because in the 5-GHz unlicensed band where Wi-Fi devices are in wide use, it is desirable for LTE-U to coexist with Wi-Fi. However, an LTE-U network may cause radio frequency (RF) interference to an existing co-channel Wi-Fi device. Choosing a preferred operating channel and minimizing the interference caused to nearby Wi-Fi networks may be a goal for LTE-U devices. However, an LTE-U single carrier (SC) device may operate on the same channel as Wi-Fi if all available channels are occupied by Wi-Fi devices. To coordinate spectrum access between LTE-U and Wi-Fi, the energy across the intended transmission band may first be detected. This energy detection (ED) mechanism informs the device of ongoing transmissions by other nodes. Based on this ED information, a device decides if it should transmit on the intended transmission band. Wi-Fi devices may not back off for LTE-U transmissions unless the interference level caused by the LTE-U transmissions is above an ED threshold (e.g., negative 62 decibel-milliwatts (dBm) over 20 MHz). Thus, without proper coexistence mechanisms in place, LTE-U transmissions could cause considerable interference on a Wi-Fi network relative to Wi-Fi transmissions.

LAA is another member of the unlicensed technology family. Like LTE-U, it may also use an anchor channel in licensed spectrum. However, it also adds "listen before talk" (LBT) operations to the LTE functionality.

A gating interval may be used to gain access to a channel of a shared spectrum. The gating interval may determine the application of a contention-based protocol such as an LBT protocol. The gating interval may indicate when a clear channel assessment (CCA) is performed. Whether a channel of the shared unlicensed spectrum is available or in use is determined by the CCA. If the channel is "clear" for use, i.e., available, the gating interval may allow the transmitting apparatus to use the channel. Access to the channel is typically granted for a predefined transmission interval. Thus, with unlicensed spectrum, a "listen before talk" procedure is performed before transmitting a message. If the channel is not cleared for use, then a device will not transmit on the channel.

Another member of this family of unlicensed technologies is LTE-wireless local area network (WLAN) Aggregation (LWA), which may utilize both LTE and Wi-Fi. Accounting for both channel conditions, LWA can split a single data flow into two data flows which allows both the LTE and the Wi-Fi channel to be used for an application. Instead of competing with Wi-Fi, the LTE signal may use the WLAN connections seamlessly to increase capacity.

The final member of this family of unlicensed technologies is MulteFire. MulteFire opens up new opportunities by operating Fourth Generation (4G) LTE technology solely in unlicensed spectrum such as the global 5 GHz. Unlike LTE-U and LAA, MulteFire may support entities without any access to the licensed spectrum. Thus, it operates in unlicensed spectrum on a standalone basis (e.g., without any anchor channel in the licensed spectrum). Thus, MulteFire differs from LTE-U, LAA, and LWA because LTE-U, LAA, and LWA aggregate unlicensed spectrum with an anchor in licensed spectrum. Without relying on licensed spectrum as the anchoring service, MulteFire allows for Wi-Fi-like deployments. A MulteFire network may include access points (APs) and/or base stations communicating in an unlicensed radio frequency spectrum band (e.g., without a licensed anchor carrier).

Demodulation reference signal (DMRS) measurement timing configuration (DMTC) is a technique that allows MulteFire to transmit with minimal or reduced interference to other unlicensed technologies, including Wi-Fi. Additionally, the periodicity of discovery signals in MulteFire may be very sparse. This allows MulteFire to access channels occasionally, transmit discovery and control signals, and then vacate the channels. Since the unlicensed spectrum is shared with other radios of similar or dissimilar wireless technologies, a so-called LBT method may be applied for channel sensing. LBT may include sensing the medium for a pre-defined minimum amount of time and backing off if the channel is busy. Therefore, the initial random access (RA) procedure for standalone LTE-U may involve a minimal number of transmissions with low latency, such that the number of LBT operations may be minimized or reduced and the RA procedure may be completed relatively quickly.

Leveraging a DMTC window, MulteFire algorithms may search and decode reference signals in unlicensed bands from neighboring base stations in order to identify a base station to serve the user. As the caller moves past one base station, their user equipment (UE) may send a measurement report to the base station, triggering a handover procedure and transferring the caller (and all of their content and information) to the next base station.

Since LTE traditionally operates in licensed spectrum and Wi-Fi operates in unlicensed bands, coexistence with Wi-Fi or other unlicensed technology was not considered when LTE was designed. In moving to the unlicensed world, the LTE waveform was modified and algorithms were added in order to perform LBT. This may support the ability to share a channel with unlicensed incumbents, including Wi-Fi, by not immediately acquiring the channel and transmitting. The present example supports LBT and the detection and transmission of Wi-Fi Channel Usage Beacon Signals (WCUBSs) for ensuring coexistence with Wi-Fi neighbors.

MulteFire was designed to "hear" a neighboring Wi-Fi base station's transmission. MulteFire may listen first and autonomously make the decision to transmit when there is no other neighboring Wi-Fi transmitting on the same channel (e.g., within a threshold range). This technique may ensure co-existence between MulteFire and Wi-Fi transmissions.

Aspects of the disclosure are initially described in the context of a wireless communication system. Aspects of the disclosure are then illustrated by and described with reference to apparatus diagrams, system diagrams, and processes that relate to using a side-communication channel for exchanging radar information to improve multi-radar coexistence.

FIG. 1 illustrates an example wireless network 100 (e.g., an NR network, a 5G network, or other type of wireless communications network or system) in accordance with aspects of the present disclosure.

As illustrated in FIG. 1, the wireless network 100 may include a number of base stations 110 and other network entities. A base station 110 may be a station that communicates with UEs 120. Each base station 110 may provide communication coverage for a particular geographic area. In 3GPP, the term "cell" may refer to a coverage area of a Node B and/or a Node B subsystem serving this coverage area, depending on the context in which the term is used. In NR systems, the term "cell" and evolved Node B (eNB), Node B, 5G narrowband (NB), AP, NR base station, NR base station, 5G Radio NodeB (gNB), or transmission reception point (TRP) may be interchangeable. In some aspects, a cell may not necessarily be stationary, and the geographic area of the cell may move according to the location of a mobile base station 110. In some aspects, the base stations 110 may be interconnected to one another and/or to one or more other base stations 110 or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A base station 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs in a Closed Subscriber Group (CSG), UEs for users in the home, etc.). A base station 110 for a macro cell may be referred to as a macro base station 110. A base station for a pico cell may be referred to as a pico base station. A base station for a femto cell may be referred to as a femto base station or a home base station. In the example shown in FIG. 1, the base stations 110a, 110b, and 110c may be macro base stations for the macro cells 102a, 102b, and 102c, respectively. The base station 110x may be a pico base station for a pico cell 102x. The base stations 110y and 110z may be femto base stations for the femto cells 102y and 102z, respectively. A base station may support one or multiple (e.g., three) cells.

The wireless network 100 may also include relay stations. A relay station is a station that receives a transmission of data and/or other information from an upstream station (e.g., a base station 110 or a UE 120) and sends a transmission of the data and/or other information to a downstream station (e.g., a UE 120 or a base station 110). A relay station may also be a UE 120 that relays transmissions for other UEs 120. In the example shown in FIG. 1, a relay station 110r may communicate with the base station 110a and a UE 120r in order to facilitate communication between the base station 110a and the UE 120r. A relay station may also be referred to as a relay base station, a relay, etc.

The wireless network 100 may be a heterogeneous network that includes base stations 110 of different types, e.g., macro base stations, pico base stations, femto base stations, relays, etc. These different types of base stations may have different transmit power levels, different coverage areas, and may have differing impacts on interference in the wireless network 100. For example, a macro base station may have a high transmit power level (e.g., 20 Watts) whereas a pico base station, or a femto base station, or a relay may have a lower transmit power level (e.g., one (1) Watt).

The wireless network 100 may support synchronous or asynchronous operation. For synchronous operation, the base stations 110 may have similar frame timing, and transmissions from different base stations 110 may be approximately aligned in time. For asynchronous operation, the base stations 110 may have different frame timing, and transmissions from different base stations 110 may not be aligned in time. The techniques described herein may be used for both synchronous and asynchronous operation.

A network controller 130 may be coupled to a set of base stations 110 and provide coordination and control for these base stations 110. The network controller 130 may communicate with the base stations 110 via a backhaul. The base stations 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE 120 may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., global positioning system (GPS), Beidou, terrestrial, etc.), or any other suitable device that is configured to communicate via a wireless or wired medium. Some UEs 120 may be considered machine-type communication (MTC) devices or evolved MTC (eMTC) devices, which may include remote devices that may communicate with a base station 110, another remote device, or some other entity. MTC may refer to communication involving at least one remote device on at least one end of the communication and may include forms of data communication which involve one or more entities that do not necessarily need human interaction. MTC UEs may include UEs 120 that are capable of MTC communications with MTC servers and/or other MTC devices through Public Land Mobile Networks (PLMNs), for example. MTC and enhanced MTC (eMTC) UEs include, for example, robots, drones, remote devices, sensors, meters, monitors, cameras, location tags, etc., that may communicate with a base station 110, another device (e.g., remote device), or some other entity. A wireless node may provide, for example, connectivity for or to a network (e.g., a wide area network such as the Internet or a cellular network) via a wired or wireless communication link. MTC UEs, as well as other UEs 120, may be implemented as Internet-of-Things (IoT) devices, e.g., narrowband IoT (NB-IoT) devices. In NB IoT, the UL and DL have higher periodicities and repetitions interval values as a UE 120 decodes data in extended coverage.

In FIG. 1, a solid line with double arrows indicates desired transmissions between a UE 120 and a serving base station, which is a base station 110 designated to serve the UE 120 on the DL and/or UL. A dashed line with double arrows indicates interfering transmissions between a UE 120 and a base station 110.

Certain wireless networks (e.g., LTE) utilize OFDM on the DL and single-carrier frequency division multiplexing (SC-FDM) on the UL. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers, K, may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024, or 2048 for system bandwidth of 1.25, 2.5, 5, 10 or 20 MHz, respectively. The system bandwidth may also be partitioned into subbands. For example, a subband may cover 1.08 MHz (e.g., six resource blocks), and there may be one, two, four, eight, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR or other wireless communications systems. NR may utilize OFDM with a CP on the UL and DL and may include support for half-duplex operation using time division duplex (TDD). A single component carrier bandwidth of 100 MHz may be supported. NR resource blocks may span 12 sub-carriers with a sub-carrier bandwidth of 75 kHz over a 0.1 milliseconds (ms) duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes (e.g., for NR) may be described in more detail with respect to FIGS. 6A, 6B, 7A, and 7B. Beamforming may be supported, and beam direction may be dynamically configured. MIMO transmissions with precoding may also be supported. MIMO configurations in the DL may support up to 8 transmit antennas with multi-layer DL transmissions up to 8 streams and up to 2 streams per UE 120. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units (CUs) and/or distributed units (DUs).

In some aspects, access to the air interface may be scheduled, where a scheduling entity (e.g., a base station 110) allocates resources for communication among some or all devices and equipment within its service area or cell. Within the present disclosure, as discussed further herein, the scheduling entity may be responsible for scheduling, assigning, reconfiguring, and releasing resources for one or more subordinate entities. That is, for scheduled communication, subordinate entities utilize resources allocated by the scheduling entity. Base stations 110 are not the sole entities that may function as a scheduling entity. That is, in some aspects, a UE 120 may function as a scheduling entity, scheduling resources for one or more subordinate entities (e.g., one or more other UEs 120). In this aspect, a first UE 120 is functioning as a scheduling entity, and other UEs 120 utilize resources scheduled by the first UE 120 for wireless communication. A UE 120 may function as a scheduling entity in a peer-to-peer (P2P) network and/or in a mesh network. In a mesh network example, UEs 120 may optionally communicate directly with one another in addition to communicating with the scheduling entity.

Thus, in a wireless communication network with a scheduled access to time frequency resources and having a cellular configuration, a P2P configuration, and a mesh configuration, a scheduling entity and one or more subordinate entities may communicate utilizing the scheduled resources.

As discussed herein, a radio access network (RAN) may include a CU and one or more DUs. An NR base station (e.g., eNB, 5G Node B, Node B, TRP, AP, or gNB) may correspond to one or multiple base stations 110. NR cells may be configured as access cell (ACells) or data only cells (DCells). For example, the RAN (e.g., a CU or DU) may configure the cells. DCells may be cells used for carrier aggregation or dual connectivity, but not used for initial access, cell selection/reselection, or handover. In some cases DCells may not transmit synchronization signals (SS), and in other cases DCells may transmit SS. NR base stations may transmit DL signals to UEs 120 indicating the cell type. Based on the cell type indication, the UE 120 may communicate with the NR base station. For example, the UE 120 may determine NR base stations to consider for cell selection, access, handover, and/or measurement based on the indicated cell type.

In some cases, the UEs 120 may be examples of vehicles operating within the wireless network 100. In these cases, the UEs 120 may detect other UEs 120 and communicate with the other UEs 120 directly (e.g., with no or minimal communication with base stations 110). In some cases, a UE 120 may transmit a radar waveform to detect nearby UEs 120. However, if these other UEs 120 also transmit radar waveforms to detect target devices, the multiple radar sources may result in interference and poor detection performance. In some aspects, each UE 120 may select waveform parameters (such as chirp slopes and/or frequency offsets) used by that UE 120 to reduce the interference caused by other radar waveforms.

Figure 2:
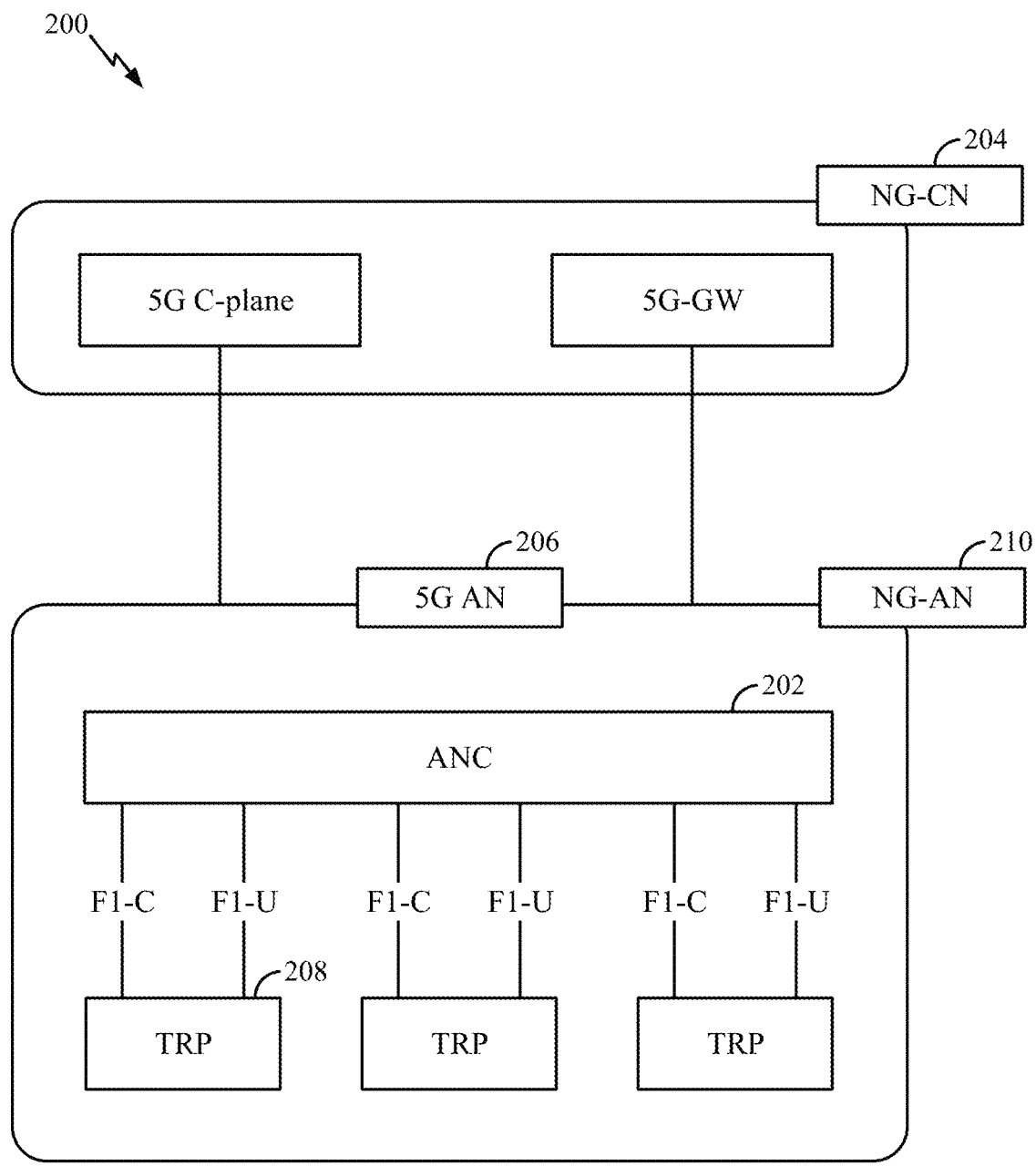
FIG. 2 illustrates an example logical architecture of a distributed radio access network (RAN) in accordance with aspects of the present disclosure.

FIG. 2 illustrates an example logical architecture of a distributed RAN 200 in accordance with aspects of the present disclosure. The distributed RAN 200 may be implemented in the wireless communication system illustrated in FIG. 1. A 5G access node 206 may include an access node controller (ANC) 202. The ANC may be a CU of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as base stations, NR base stations, Node Bs, 5G NBs, APs, eNBs, gNBs, or some other term). As described herein, a TRP 208 may be used interchangeably with "cell."

The TRPs 208 may be examples of DUs. The TRPs 208 may be connected to one ANC (e.g., ANC 202) or more than one ANC. For example, for RAN sharing, radio as a service (RaaS), and service specific ANC deployments, the TRP 208 may be connected to more than one ANC 202. A TRP 208 may include one or more antenna ports. The TRPs 208 may be configured to individually (e.g., in dynamic selection) or jointly (e.g., in joint transmission) serve traffic to a UE.

The local architecture may be used to illustrate fronthaul definition. The architecture may be defined such that it may support fronthauling solutions across different deployment types. For example, the architecture may be based on transmit network capabilities (e.g., bandwidth, latency, and/or jitter).

The architecture may share features and/or components with LTE. According to aspects, the NG-AN 210 may support dual connectivity with NR. The NG-AN 210 may share a common fronthaul for LTE and NR.

The architecture may enable cooperation between and among TRPs 208. For example, cooperation may be preset within a TRP 208 and/or across TRPs 208 via the ANC 202. According to aspects, no inter-TRP interface may be needed/present.

According to aspects, a dynamic configuration of split logical functions may be present within the architecture. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP 208 or ANC 202, respectively). According to certain aspects, a base station may include a CU (e.g., ANC 202) and/or one or more distributed units (e.g., one or more TRPs 208). In some cases, the distributed RAN 200 may support systems containing multi-radar coexistence. In these cases, the distributed RAN 200 may support the selection of radar waveform parameters to allow devices to differentiate device-specific radar waveforms, allowing for improved multi-radar coexistence between the devices.

Figure 3:
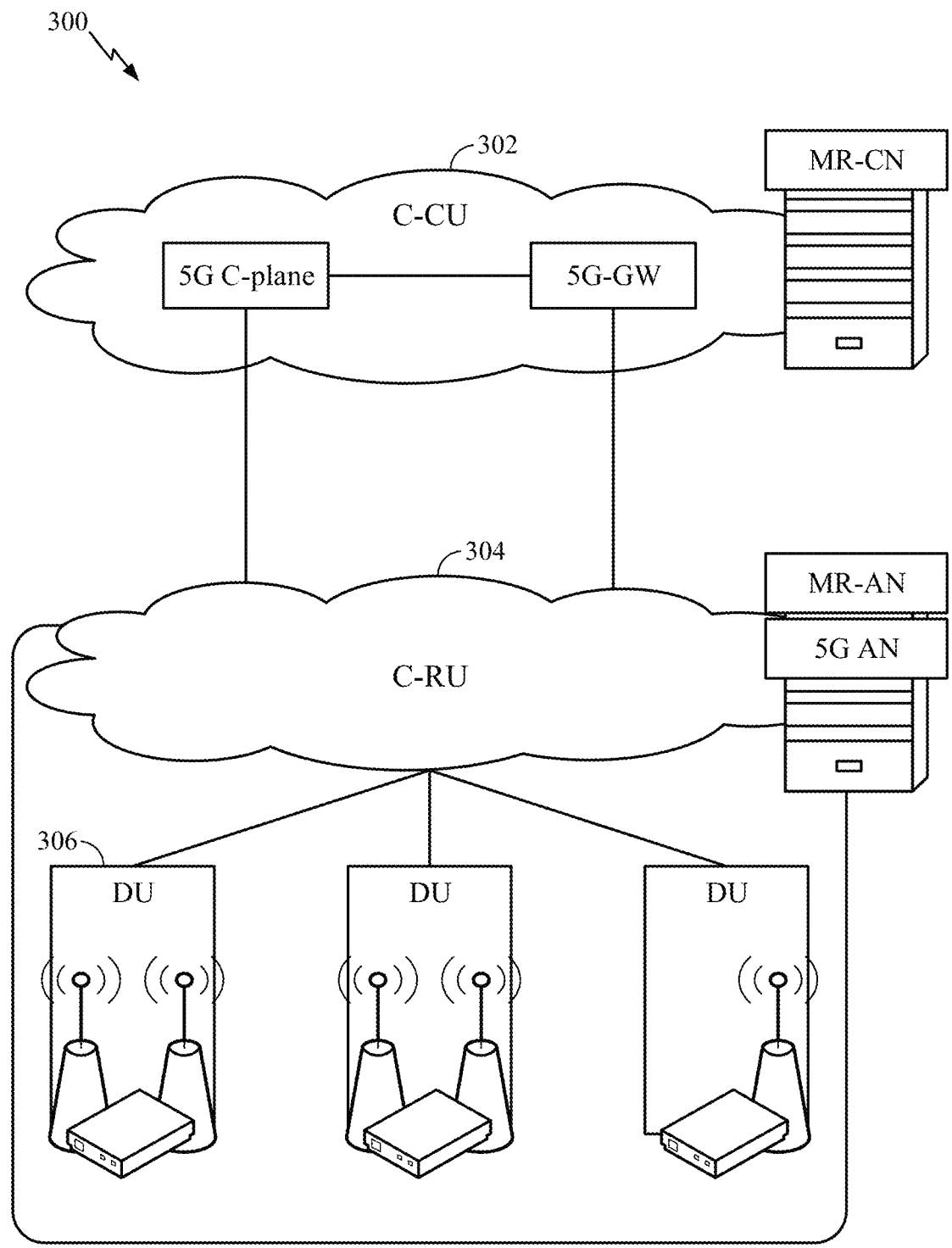
FIG. 3 illustrates an example physical architecture of a distributed RAN in accordance with aspects of the present disclosure.

FIG. 3 illustrates an example physical architecture of a distributed RAN 300 in accordance with aspects of the present disclosure. A centralized core network unit (C-CU) 302 may host core network functions. The C-CU 302 may be centrally deployed. C-CU 302 functionality may be offloaded (e.g., to advanced wireless services (AWSs)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be closer to the network edge.

A DU 306 may host one or more TRPs (e.g., edge nodes (ENs), edge units (EUs), radio heads (RHs), smart radio heads (SRHs), or the like). The DU 306 may be located at edges of the network with RF functionality. In some cases, the distributed RAN 300 may support devices that may select radar waveform parameters to improve multi-radar coexistence.

Figure 4:
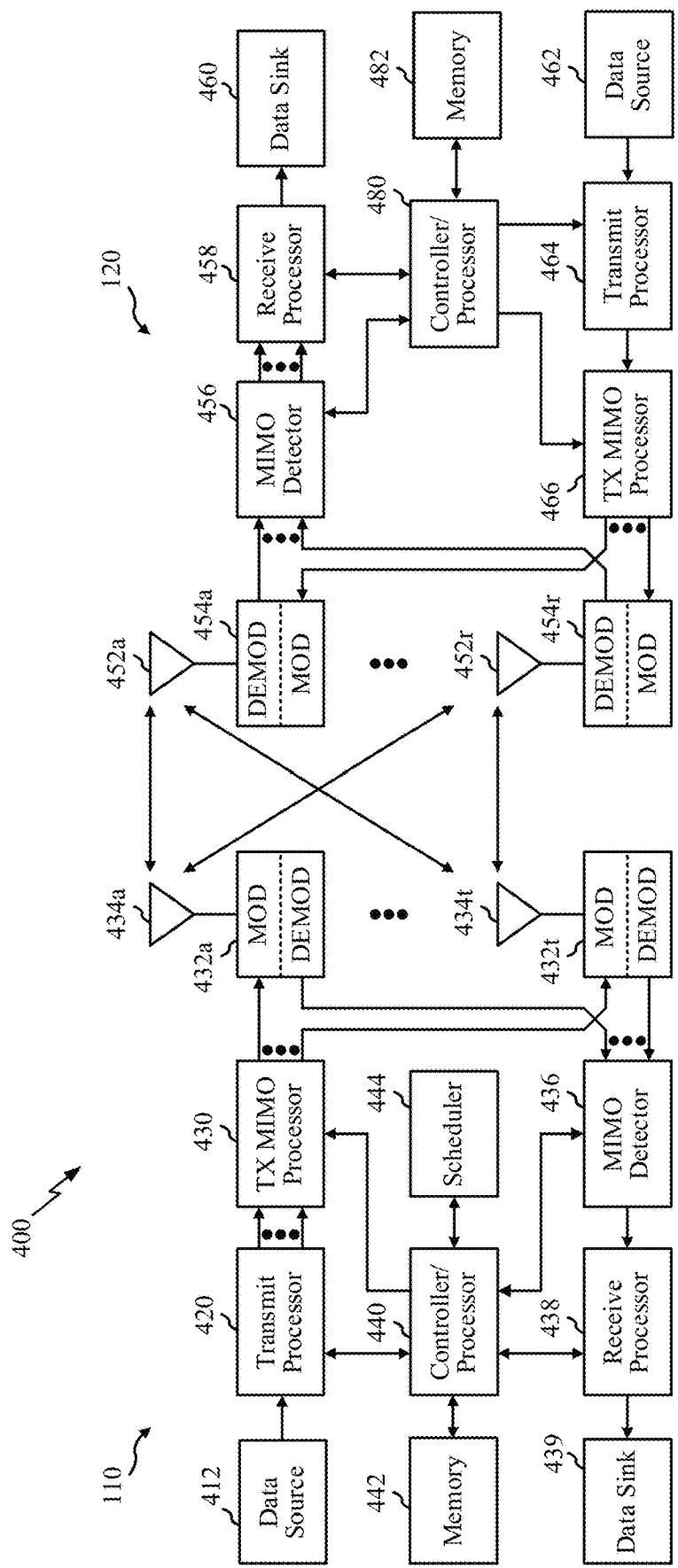
FIG. 4 illustrates example components of a base station and a user equipment (UE) in a wireless communications system in accordance with aspects of the present disclosure.

FIG. 4 illustrates example components of a base station 110 and a UE 120 (e.g., as illustrated in FIG. 1) in a wireless communications system 400 in accordance with aspects of the present disclosure. As described herein, the base station 110 may include one or more TRPs. One or more components of the base station 110 and UE 120 may be used to practice aspects of the present disclosure. For example, antennas 452, processors 466, 458, 464, and/or controller/processor 480 of the UE 120 and/or antennas 434, processors 430, 420, 438, and/or controller/processor 440 of the base station 110 may be used to perform the operations described herein.

FIG. 4 shows a block diagram of a design of a base station 110 and a UE 120, which may be one of the base stations and one of the UEs described with reference to FIG. 1. For a restricted association scenario, the base station 110 may be the macro base station 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid Automatic Repeat Request (ARQ) Indicator Channel (PHICH), Physical Downlink Control Channel (PDCCH), etc. The data may be for the Physical Downlink Shared Channel (PDSCH), etc. The transmit processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), cell-specific reference signal, etc. A transmit (TX) MIMO processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for reference signal (RS) multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a DL signal. DL signals from modulators 432a through 432t may be transmitted via the antennas 434a through 434t, respectively.

At the UE 120, the antennas 452a through 452r may receive the DL signals from the base station 110 and may provide received signals to the demodulators 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, coordinated multi-point (CoMP) aspects can include providing the antennas, as well as some Tx/receive (Rx) functionalities, such that they reside in DUs. For example, some Tx/Rx processing may be done in the CU, while other processing can be done at the DUs. In accordance with one or more aspects as shown in the diagram, the base station MOD/DEMODs 432 may be in the DUs.

On the UL, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the UL signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the base station 110 and the UE 120, respectively. A scheduler 444 may schedule UEs for data transmission on the DL and/or UL.

While FIG. 4 illustrates communication between a base station 110 and a UE 120, in some systems UEs 120 may detect each other and transmit information directly to one another (e.g., over a side-communication channel). UEs 120 may communicate with the other UEs 120 directly (e.g., without the communication passing through or being relayed by a base station 110). In some cases, a UE 120 may transmit a radar waveform (e.g., using an antenna 452) to detect nearby UEs 120 to facilitate communication or for collision avoidance. To improve multi-radar coexistence between the UEs 120, each UE 120 may select radar waveform parameters to reduce interference. For example, a UE 120 may transmit a waveform by transmitting multiple chirps of a waveform. A chirp may be a waveform whose frequency changes (e.g., increases or decreases). Each chirp of a waveform may have a time period, and the rate at which the frequency changes during the time period may be referred to as a chirp slope. A chirp may also be associated with a frequency offset. Thus, the chirp slope and frequency offset may be waveform parameters that may specify the characteristics of the chirp.

In some cases, a UE 120 may vary its waveform parameters for at least a subset of chirps of a transmitted signal to reduce interference with signals emitted by other nearby UEs 120 or other devices. Varying the waveform parameters in this manner may improve the reliability of the target detection procedure performed by the UE 120.

Figure 5A:
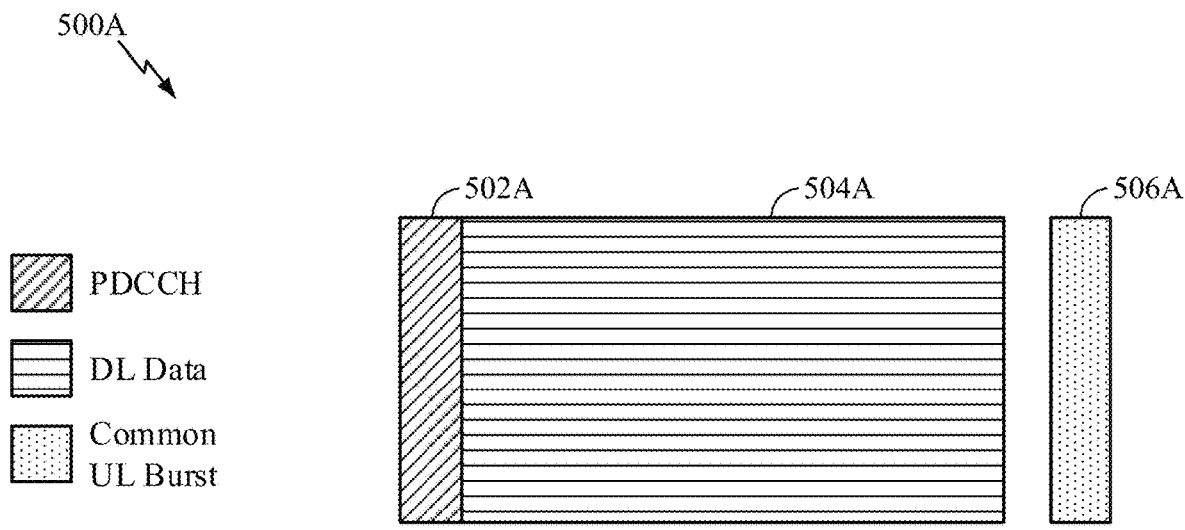
FIG. 5A illustrates an example of a downlink (DL)—centric subframe in accordance with aspects of the present disclosure.

FIG. 5A illustrates an example of a DL-centric subframe 500A in accordance with aspects of the present disclosure. The DL-centric subframe 500A may include a control portion 502A. The control portion 502A may exist in the initial or beginning portion of the DL-centric subframe 500A. The control portion 502A may include various scheduling information and/or control information corresponding to various portions of the DL-centric subframe 500A. In some configurations, the control portion 502A may be a PDCCH, as indicated in FIG. 5A.

The DL-centric subframe 500A may also include a DL data portion 504A. The DL data portion 504A may sometimes be referred to as the payload of the DL-centric subframe 500A. The DL data portion 504A may include the communication resources utilized to communicate DL data from a scheduling entity 202 (e.g., eNB, base station, Node B, 5G NB, TRP, gNB, etc.) to a subordinate entity, e.g., a UE 120. In some configurations, the DL data portion 504A may be a PDSCH.

The DL-centric subframe 500A may also include a common UL portion 506A. The common UL portion 506A may sometimes be referred to as an UL burst, a common UL burst, and/or various other suitable terms. The common UL portion 506A may include feedback information corresponding to various other portions of the DL-centric subframe 500A. For example, the common UL portion 506 may include feedback information corresponding to the control portion 502A. Non-limiting examples of feedback information may include an acknowledgment (ACK) signal, a negative acknowledgment (NACK) signal, a hybrid automatic repeat request (HARD) indicator, and/or various other types information. The common UL portion 506A may include additional or alternative information, such as information pertaining to random access channel (RACH) procedures, scheduling requests (SRs), sounding reference signals (SRS), and various other suitable types of information.

As illustrated in FIG. 5A, the end of the DL data portion 504A may be separated in time from the beginning of the common UL portion 506A. This time separation may sometimes be referred to as a gap, a guard period (GP), a guard interval, and/or various other suitable terms. This separation provides time for the switchover from DL communication (e.g., reception operation by the subordinate entity, e.g., UE 120) to UL communication (e.g., transmission by the subordinate entity, e.g., UE 120). One of ordinary skill in the art will understand, however, that the foregoing is merely one example of a DL-centric subframe 500A and alternative structures having similar features may exist without necessarily deviating from the aspects described herein.

Figure 5B:
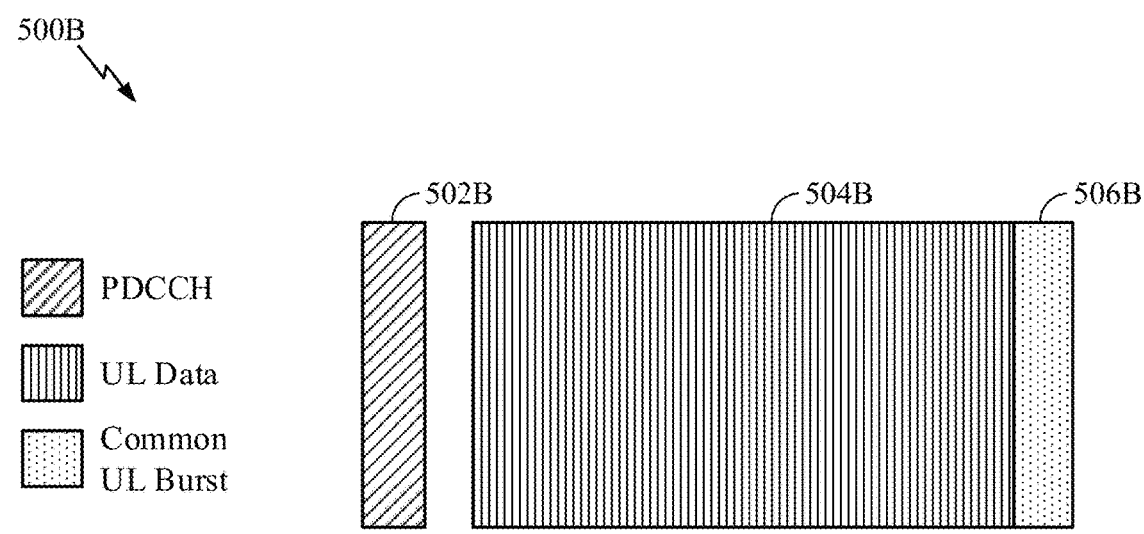
FIG. 5B illustrates an example of an uplink (UL)—centric subframe in accordance with aspects of the present disclosure.

FIG. 5B illustrates an example of an UL-centric subframe 500B in accordance with aspects of the present disclosure. The UL-centric subframe 500B may include a control portion 502B. The control portion 502B may exist in the initial or beginning portion of the UL-centric subframe 500B. The control portion 502B in FIG. 5B may be similar to the control portion 502A described herein with reference to FIG. 5A. The UL-centric subframe 500B may also include an UL data portion 504B. The UL data portion 504B may sometimes be referred to as the payload of the UL-centric subframe 500B. The UL portion may refer to the communication resources utilized to communicate UL data from the subordinate entity (e.g., a UE 120) to the scheduling entity 202 (e.g., a base station 110). In some configurations, the control portion 502B may be a PUSCH. As illustrated in FIG. 5B, the end of the control portion 502B may be separated in time from the beginning of the UL data portion 504B. This time separation may sometimes be referred to as a gap, GP, guard interval, and/or various other suitable terms. This separation provides time for the switchover from DL communication (e.g., reception operation by the scheduling entity 202) to UL communication (e.g., transmission by the scheduling entity 202).

The UL-centric subframe 500B may also include a common UL portion 506B. The common UL portion 506B in FIG. 5B may be similar to the common UL portion 506A described herein with reference to FIG. 5A. The common UL portion 506B may additionally or alternatively include information pertaining to channel quality indicators (CQIs), SRSs, and various other types of information. One of ordinary skill in the art will understand that the foregoing is merely one aspect of an UL-centric subframe 500B and alternative structures having similar features may exist without necessarily deviating from the aspects described herein.

As described herein, an UL-centric subframe 500B may be used for transmitting UL data from one or more mobile stations to a base station, and a DL centric subframe may be used for transmitting DL data from the base station to the one or more mobile stations. In one aspect, a frame may include both UL-centric subframes 500B and DL-centric subframes 500A. In this aspect, the ratio of UL-centric subframes 500B to DL-centric subframes 500A in a frame may be dynamically adjusted based on the amount of UL data and the amount of DL data to be transmitted. For example, if there is more UL data, then the ratio of UL-centric subframes 500B to DL-centric subframes 500A may be increased. Conversely, if there is more DL data, then the ratio of UL-centric subframes 500A to DL-centric subframes 500B may be decreased.

Multiple radar sources may lead to significant interference. Some radar waveforms, such as frequency-modulated continuous-wave (FMCW) radar, may not natively support multiple access and thereby may be indistinguishable when transmitted from various sources (e.g. vehicles). Thus, with multiple radar sources, it may be difficult to determine whether a reflection is from a detected target or whether the reflection is interference from another radar source (e.g., another vehicle).

Based on a reflection of a FMCW signal, an automotive radar may determine a distance to a target along with relative velocity between the target and the source vehicle. For example, FMCW automotive radars may obtain range and velocity information from the beat frequency, which is composed of propagation delay and Doppler frequency. A Doppler frequency shift, $$f_D = \frac{2v}{\lambda},$$

may be introduced by a target which moves with velocity v with a radar wavelength λ. In the multi-radar coexistence scenario, the transmissions from other radar sources (e.g., vehicles) may appear as a ghost target, which may be particularly bothersome since the ghost target may appear in the same angular direction as the desired reflected signal from that object (e.g., a vehicle) and may not be readily identifiable as a ghost or normal (desired) target.

Furthermore, the direct signal from the radar source may be significantly stronger than the reflected signal from the target and may present a problem for the receiver to detect the weak reflected signals in the presence of strong interfering transmissions from other radar sources. In some cases, the reflected signal may decay at approximately $1/R^4$, where R is the distance from the target to the vehicle emitting the FMCW waveform, while the source signal from other vehicles may decay at $1/R^2$.

Figure 6A:
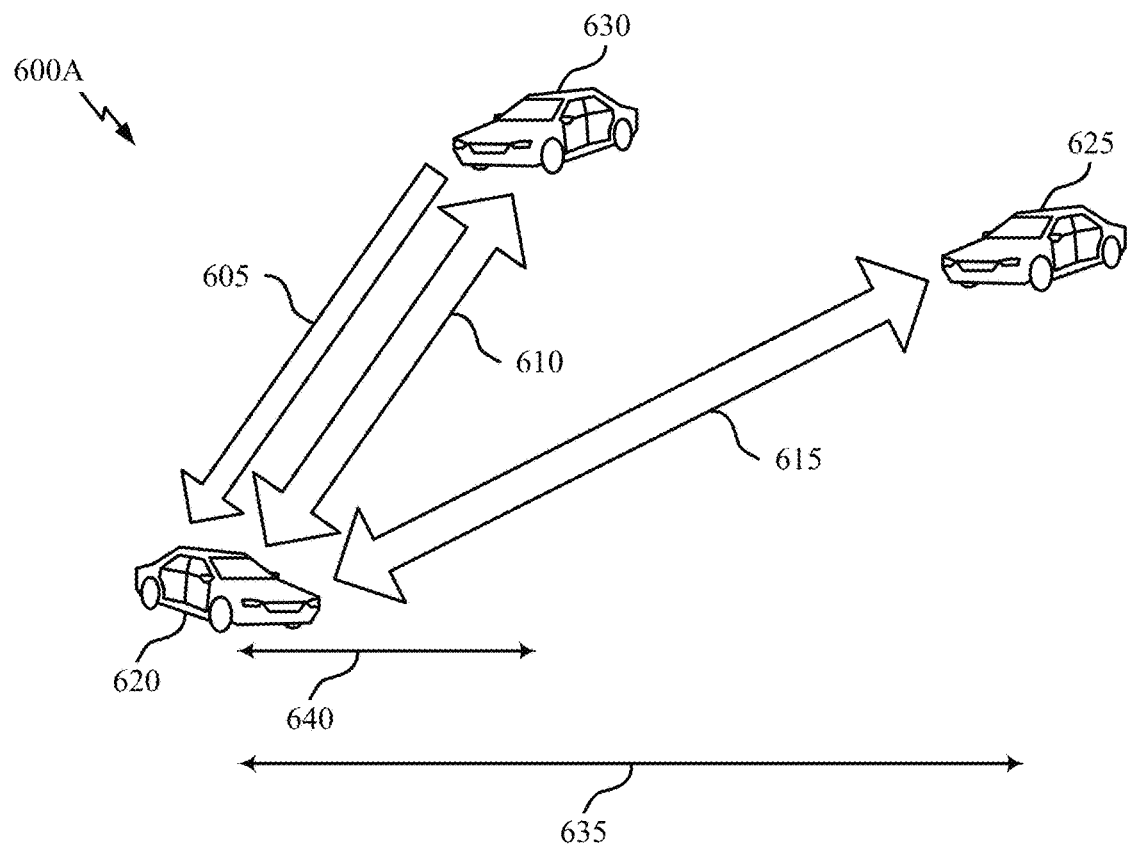
FIG. 6A illustrates an example wireless communications system in accordance with aspects of the present disclosure.

FIG. 6A illustrates an example wireless communications system 600A in accordance with aspects of the present disclosure. The wireless communications system 600A may include a vehicle 620 that emits radar. The vehicle 620 may be an example of a UE 120 as described with reference to FIGS. 1 through 5. The vehicle 620 may encounter other UEs 120 (e.g., vehicles 625 and 630), which may be moving toward or away from vehicle 620. Both vehicles 625 and 630 reflect back desired signals 610 and 615, respectively (e.g., based on the radar emitted by the vehicle 620). The vehicle 630 closest to the vehicle 620 may also transmit radar 605 or another type of signal which may act as interference to the vehicle 620. If the vehicle 630 transmits a radar waveform, the vehicle 620 may not be able to distinguish the interference caused by the radar waveform 605 from a reflected signal indicating a nearby target (e.g., a nearby UE 120, vehicle, structure, interference source, etc.).

Figure 6B:
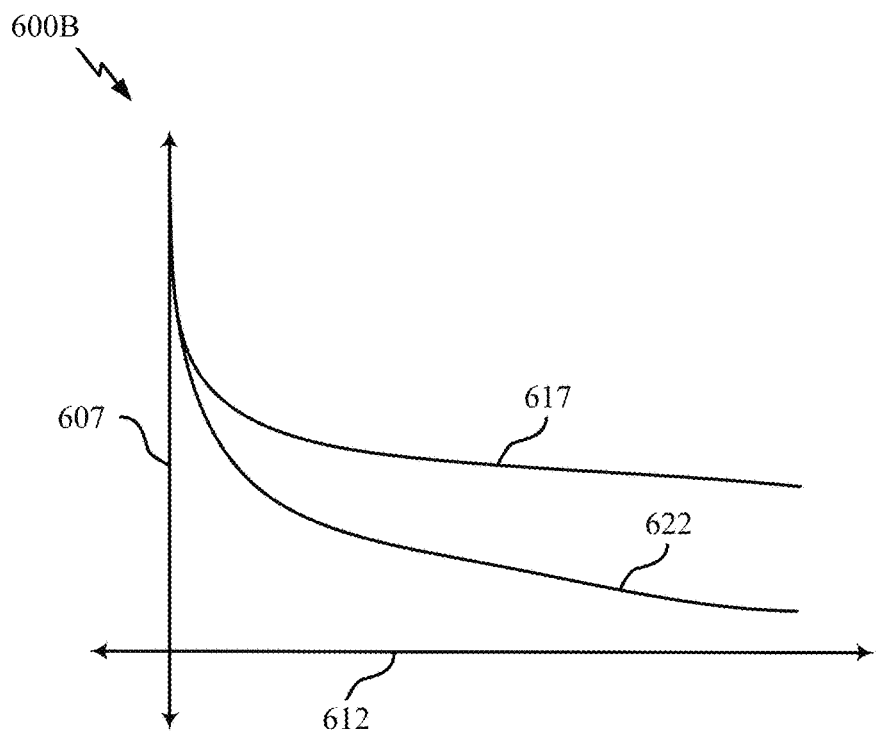
FIG. 6B illustrates an example graph showing received power of direct and reflected signals over distance in accordance with aspects of the present disclosure.

FIG. 6B illustrates an example graph 600B showing received power of direct and reflected signals over distance in accordance with aspects of the present disclosure. The graph 600B may illustrate the problem with interference from direct signals, in that interference due to a direct transmission 617 is much stronger than the reflected signal from a target 622. Axis 607 may represent a range of received power values (in dBm) for the signals and axis 612 may represent distances from the source (e.g., vehicle 620 emitting the radar) to the target (e.g., vehicle 630). Interference may appear as a ghost target at half the distance (e.g., plus a time offset) from the actual target and with a high power. With reflected signals from targets, the desired (i.e., reflected) signals may have relatively low signal-to-interference ratios (SIRs) due to the near-far effect, the direct transmission 617 being received at a much stronger power than the reflected (desired) signal from the target 622, or both. That is, the interference may have a relatively high power compared to the desired signals reflected from the target.

The graph 600B shows the received signal power from a reflected (desired) path based on a device (e.g., due to a radar transmission by a first source device) and a direct (interfering) signal from a second source device, assuming the same transmit power at both radar sources. The reflected signal may decay by a factor of approximately $1/R^4$, where R is the distance from the vehicle 630 reflecting the radar and the direct, interference signal may decay by a factor of approximately $1/R^2$, where R is the distance from the vehicle 630 transmitting the direct, interference radar signal. Thus, based on the example illustrated in FIGS. 6A and 6B, the reflected signal 615 from a desired target 625 at a distance 635 away (e.g., one hundred fifty (150) meters (m) away from the source vehicle 620) may be weaker than a direct interfering signal from a nearby source 630 at a distance 640 away (e.g., 10m) and may present a challenging environment for target detection. Note that, in some scenarios, some spatial rejection is possible to mitigate the near-far effect and depends on the geometry (e.g., location of desired radar source, target, interfering radar source, etc.) and spatial response of the radar receiver antennas. However, such a spatial rejection may not always occur. For example, cases where the three cars in FIG. 6A are on (or close to) a straight line to have no (or small) angular difference between the two radio paths (desired radar to the target vs. desired radar to the interfering radar) may not always include spatial rejection.

The present method, apparatuses, and non-transitory processor-readable storage medium may enable multi-channel coexistence from multiple radar sources using a phase-coded waveform (e.g., FMCW waveform). In some cases, including for vehicles, the FMCW is the most commonly used waveform. However, the operations described herein may apply to other radar waveforms as well. With FMCW, the frequency of the waveform is varied linearly with time as a sawtooth or triangle shaped function. A vehicle 620 transmitting the radar waveform may receive and process reflected signals from target(s) and detect the range and Doppler of each target based on the difference in the received and the transmitted frequencies. In some cases, a transmitted radar waveform may include frequency modulation ramps, which may also be referred to as chirps, and which may each have a specific chirp duration. In FMCW, a modulating signal may vary a chirp's instantaneous frequency linearly (e.g., from 0 to B Hz) over a fixed period of time (e.g., sweep time $T_c$).

Figure 7A:
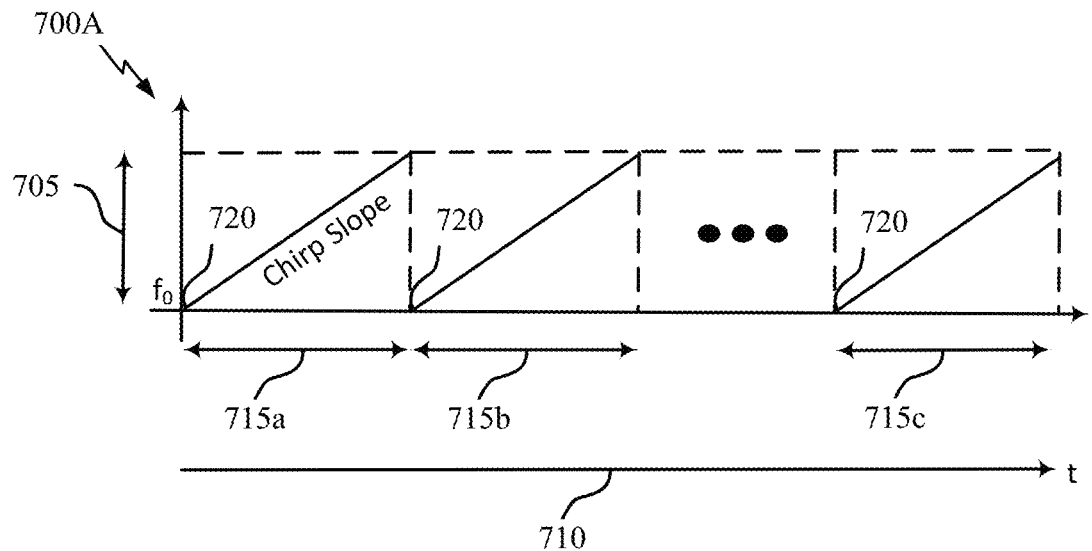
FIGS. 7A and 7B illustrate frequency-time plots of a frequency modulated continuous wave (FMCW) in accordance with aspects of the present disclosure.
Figure 7B:
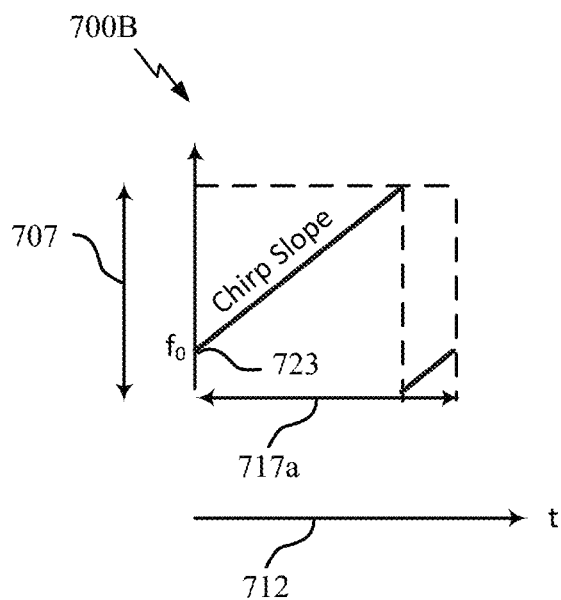

FIGS. 7A and 7B illustrate frequency-time plots 700A and 700B of an FMCW transmitted using chirps associated with various waveform parameters in accordance with aspects of the present disclosure. In frequency-time plots 700A and 700B, B may represent a frequency range 705 or 707 for the FMCW and $T_c$ may represent the duration of a chirp 715 or 717 (e.g., in time domain 710 or 712). The frequency of the wave sweeps across the entire bandwidth from zero (0) to B (where 0 and B illustrate the range of the frequency, and the actual frequency values may be any values in the bandwidth). A modulating signal, x(t) (e.g., as depicted in frequency-time plots 700A and 700B), may ramp up its frequency over the bandwidth, B, starting at a frequency offset, $f_0$. The transmitted signal x(t) may hit a target and reflect back to a receive antenna where the reflections of transmitted signals x(t) are collected or received. A frequency difference, $\Delta f$, between the transmitted signal and the received signal may increase with a delay of receiving the reflected signal. The distance of the target from the radar may be called a range, and the delay, $\tau$, may be linearly proportional to the range between the target and the transmission source and may be equal to the round trip travel time. An echo (e.g., a reflected signal) from the target may be mixed with the transmitted signal and down-converted to produce a beat signal which, after demodulation, may be linearly proportional to the range between the target and the source of the signal.

Figure 8:
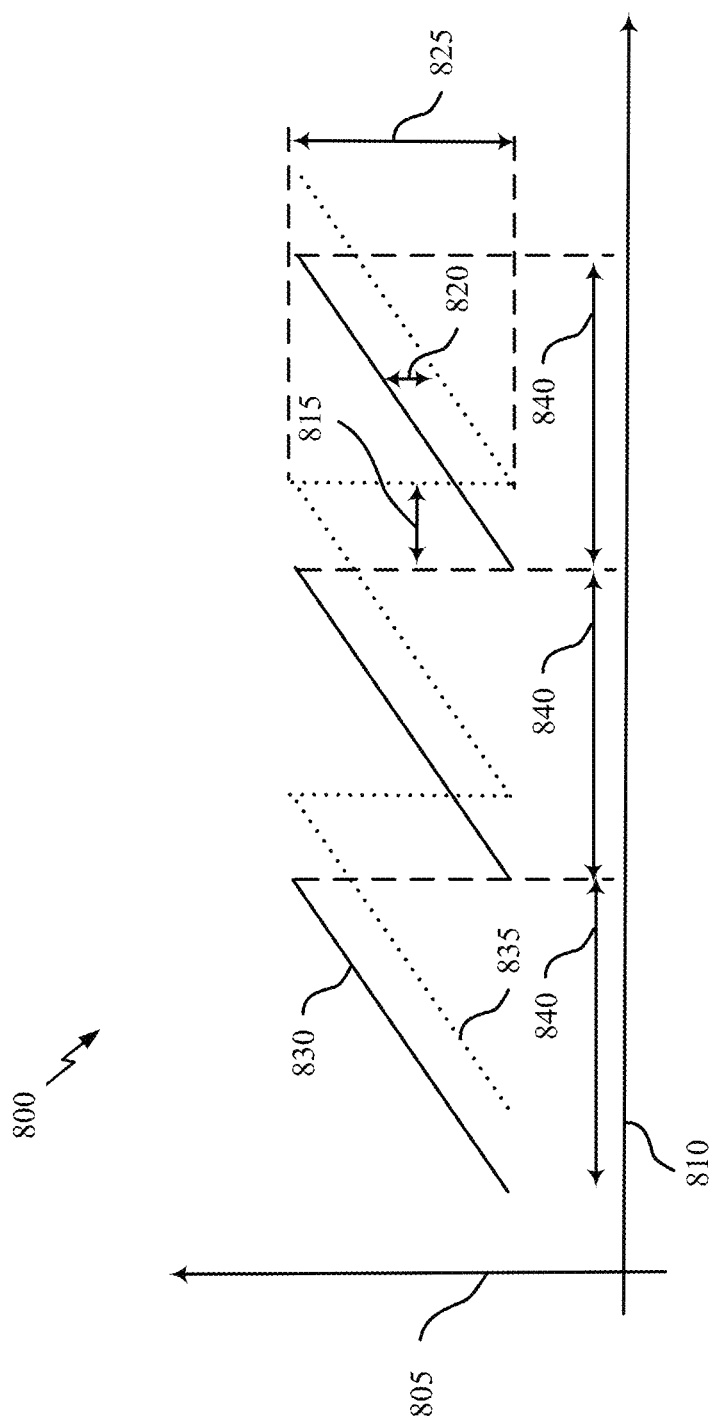
FIG. 8 illustrates received and transmitted ramp waveforms with sawtooth chirp modulation in accordance with aspects of the present disclosure.

FIG. 8 illustrates an FMCW system 800 with received and transmitted ramp waveforms with sawtooth chirp modulation in accordance with aspects of the present disclosure.

Axis 805 may represent frequency, and axis 810 may represent time. Time interval 815 may represent the delay, $\tau$. Frequency interval 820 may represent the frequency difference, $\Delta f$, between the transmitted signal 830 and the received signal 835. Transmitted signal 830 includes multiple chirps having chirp duration $T_c$. Received signal 835 includes multiple reflected chirps having chirp duration $T_c$. Frequency interval 825 may be a frequency range, B, for the chirps.

The FMCW transmit waveform x(t) is shown in FIGS. 7A and 7B and may be described by an equation:

$$x(t)=\exp(-j2\pi f_c t)\exp(-j\pi(\beta t+f_0)t), \quad (1)$$

where $f_c$ is the carrier frequency, $\beta$ is the slope, and $f_0$ is the frequency offset.

In some cases (e.g., as illustrated), the chirp duration $T_c$ may stay the same for a radar waveform, and the frequency of the wave may sweep through the frequency range B any number of times within the chirp duration. In other cases, the chirp duration $T_c$ may correspond to a single frequency sweep through the frequency range B, and, accordingly, the chirp duration $T_c$ may vary for a set of chirps depending on the slope, $\beta$. For a "fast" chirp, the $T_c$ duration is short, and for a "slow" chirp, the $T_c$ duration is long. In some cases, a UE 120 (e.g., a vehicle) may select a set of waveform parameters for transmission of the radar waveform and may vary the set of waveform parameters for two or more chirps, resulting in selected waveform parameters corresponding to frequency-time plot 700B.

The system may be configured to determine how much to vary the chirp parameters. As stated above, two parameters which may completely define the waveform used over the chirp $T_c$ may be the slope $\beta$ and the frequency offset $f_0$, where the slope may be defined as $$\beta = \frac{B}{T_c}$$

for a specific chirp. For example, an FMCW radar system may be designed to sweep the frequency linearly over 1 GHz and 50 microseconds (us), yielding a slope $\beta=1$ GHz/50 us, and the frequency offset $f_0$ can be set to any value between 0 to 1 GHz. 0 to 1 GHz. The frequency offset $f_0$ may correspond to the initial frequency value at the start of the chirp duration $T_c$. In FIG. 7A, the slope and frequency offset may be kept constant over multiple chirps. As seen in FIG. 7A, multiple chirps may be transmitted back to back. That is, B 705 may be the same for each chirp of a set of chirps and $T_c$ 715a, 715b, and 715c may be the same for the set of chirps, resulting in a constant slope $\beta$ for the set of chirps. Additionally, the frequency offset, $f_0$, may be the same for each chirp of the set of chirps.

In FIG. 7B, instead of keeping the parameters constant, a UE may vary the parameters (e.g., to change the radar waveforms) from chirp to chirp. For example, in FIG. 7B, the ramp may start at a frequency offset $f_0$, (e.g., B/2), ramp up to a frequency (e.g., B), go back to 0 (i.e., zero offset) and ramp to the frequency offset (e.g., B/2). Typically, the frequency of the radar may sweep from 1 to 2 GHz. The chirp period may typically span between 10 to 200 microseconds.

The receiver may process multiple reflected radar waveforms. For example, a waveform for the processed, received signal, y(t), may be represented by:

$$y(t) \approx \exp\left(-j2\pi f_c\left(1-\frac{v}{c}\right)t\right)\exp(-j\pi(\beta(t-t_0)+f_0)(t-t_0)) \quad (2)$$

$$y(t) = x(t)K_\phi \exp\left(j2\pi\frac{v}{\lambda}t\right)\exp(j2\pi\beta t_0 t),$$

where x(t) is the transmitted waveform, $K_\phi=\exp(-j\pi(\beta t_0 - f_0)t_0)$ is a phase term that depends on the time delay of the target, $\exp(-j2\pi(v/\lambda)t)$ is a phase ramp corresponding to the Doppler, $\exp(-j2\pi\beta t_0 t)$ is phase ramp corresponding to the time delay of the target, v is velocity, c is the speed of light, $\lambda$ is the wavelength of the transmitted waveform, and $t_0$ is the time delay. In some cases, the processed received waveform y(t) may be represented as the transmitted waveform x(t) multiplied by a phase term $K_\phi$ (e.g., which depends on the slope and offset of the transmitted FMCW waveform and the time delay of the target) and two phase ramps (e.g., each corresponding to the time delay and Doppler of the target).

In some cases, when performing coherent detection, the received signal may be compared with (e.g., descrambled by, multiplied by) the transmitted signal in the analog domain before conversion into the digital domain to process for target detection. For example, the received signal may be processed according to $$r(t) = y(t)x^*(t) = K_\phi \exp\left(j2\pi\frac{v}{\lambda}t\right)\exp(j2\pi\beta t_0 t), \quad (3)$$

In some cases, down converting the descrambled received waveform to the digital domain (e.g., assuming a sampling rate of $F_s$), may result in a waveform that may be represented as:

$$r[m, n] = K_\phi \exp\left(j2\pi\frac{v}{\lambda}\left(mT_c+\frac{n}{F_s}\right)\right)\exp\left(j2\pi\beta t_0\left(mT_c+\frac{n}{F_s}\right)\right) \quad (4)$$

$$r[m, n] \approx K_\phi \exp\left(j2\pi\left(\frac{v}{\lambda}T_c N_c\right)\frac{m}{N_c}\right)\exp\left(j2\pi(\beta T_c t_0)\frac{n}{F_s T_c}\right),$$

where r[m, n] represents digital samples corresponding to received waveform r(t) (after descrambling with the transmitted waveform), $K_\phi$ is a phase term that depends on the time delay of the target, v is velocity, c is the speed of light, $\lambda$ is the wavelength of the transmitted waveform, $t_0$ is the time delay, m is the chirp index, and n is the index of a sample within a chirp. The approximation may involve decoupling the delay and Doppler phase ramps by assuming negligible phase ramp changes within a chirp due to Doppler. Therefore, the processed received signal, r [m, n], may be represented by the by a phase term $K_\phi$ and two phase ramp terms (e.g., each corresponding to the time delay and Doppler of the target).

The processed received signal, r [m, n], may be represented by a phase term $K_\phi$ and two phase ramp terms corresponding to the time delay and Doppler of the target) as shown below:

$$r[m, n] = K_\phi \exp\left(j2\pi\left(\frac{v}{\lambda}T_c N_c\right)\frac{m}{N_c}\right)\exp\left(j2\pi(\beta T_c t_0)\frac{n}{F_s T_c}\right), \quad (5)$$

where m is the chirp index, $\beta$ is the slope, $\lambda$ is the wavelength, $T_c$ is the period or duration of the chirp, $F_s$ is the sampling rate at the receiver, v is the velocity, $N_c$ is a total number of the chirps over which over which varying the parameters is performed, n is the sample index, and $t_0$ is the time offset. In some cases, when the received signal is multiplied with the transmitted signal in the analog domain before down conversion, $F_s$ may be less than the chirp frequency range, B. If the slope and offset of the transmitted waveform are kept constant, and assuming negligible changes in the time delay of the target due to mobility over the multiple chirps being processed, the phase term $K_\phi$ may be constant. The receiver processing for target detection may then use the slope of the two phase ramps to estimate the velocity v and time delay $t_0$ of the targets.

Figure 7C:
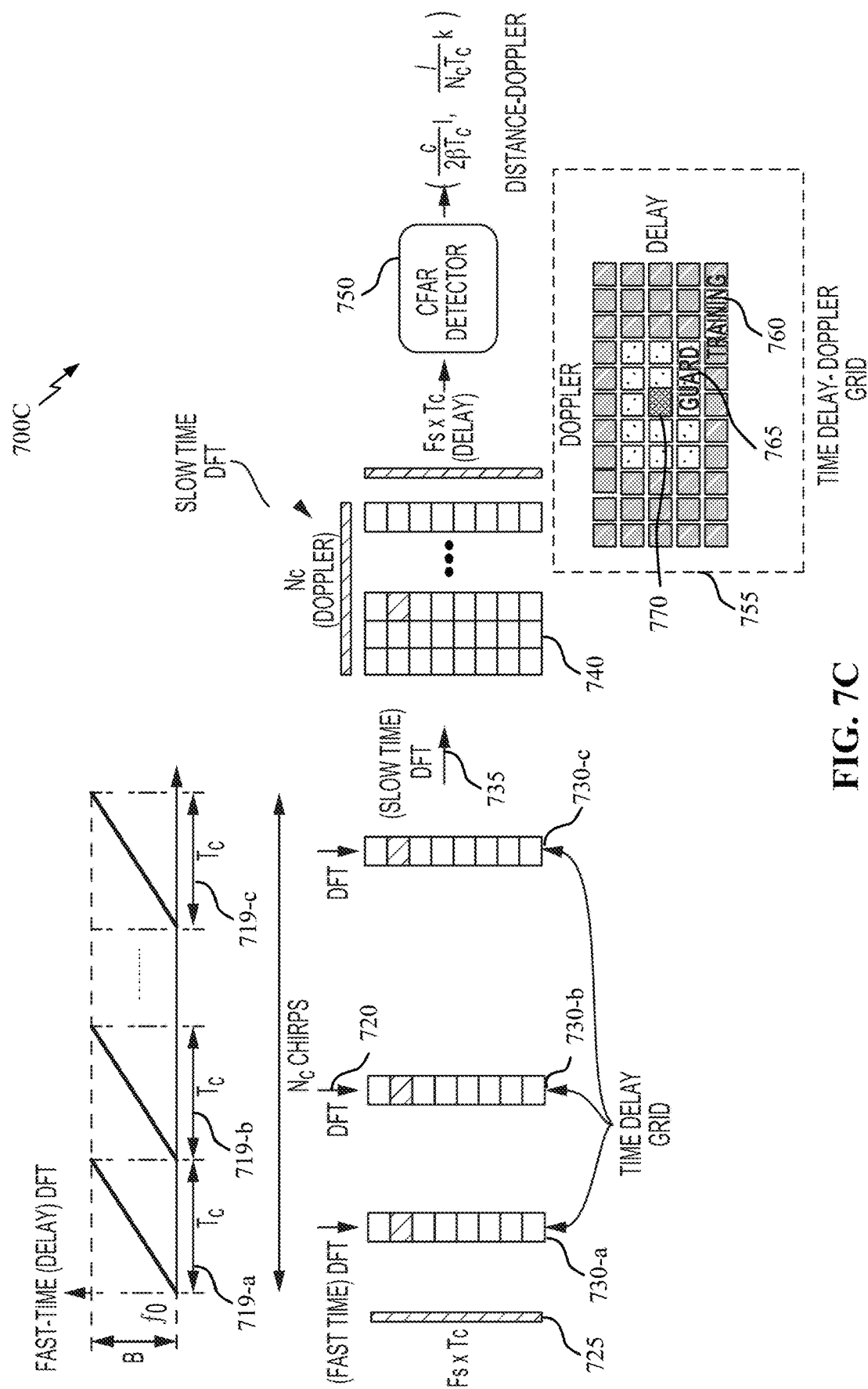
FIG. 7C illustrates an example of signal processing in accordance with aspects of the present disclosure.

FIG. 7C illustrates an example of signal processing 700C that may be performed on multiple reflected chirps (e.g., chirps that are transmitted and received by, a same TIE 120). A first level discrete Fourier transform (DFT) 720 called a fast time DFT 720 may be used to process the received (e.g., reflected) waveforms. FIG. 7C shows three columns of bins resulting from fast time DFT 720 for three corresponding chirps 719-a, 719-b, and 719-c (e.g., received in a time dimension 714, where each chirp has a same frequency range 709). Each column may represent a time-delay dimension 730 or time-delay grid 730 with a grid size 725 of $F_s \times T_c$. As explained above, the chirps may be processed by applying a fast time DFT 720 to a single chirp, which may yield a target peak in a bin on a respective time-delay grid 730, where the bin may represent a time offset. A fast time DFT 720 may be performed for every chirp 719. The peak may be represented by a cross hatched bin in time delay grid 730 (e.g., a 1-D graph), where the vertical access represents time. Thus, the target peak may represent a particular time offset or time offset range for one chirp 719 corresponding to a target.

In one example, a next processing step may include applying a slow time DFT 735 to all the fast time DFT 72.0 results. For example, a slow time DFT 735 may be performed on two or more chirps 719. In some aspects, the slow time DFT 735 may be applied to less than all of the fast time DFT 720 results. The slow time DFT 735 may be run across the fast time DFTs in order to add the target peaks in the time offset bins 730 to produce a Doppler peak in a Doppler-time delay grid 740. Therefore, for a given target, the fast time DFT 720 may produce a peak in the time-delay dimension 730, where each bin represents a time offset, and the slow time DFT 735 may produce a peak in the Doppler-time delay grid 740, where a bin may represent a time offset and a Doppler value. Cross hatched bins may represent a location of a target peak.

The following equation may be used to calculate a two-dimensional (2D) DFT (e.g., corresponding to a Doppler-time delay grid 740) for time-delay and Doppler detection, where time-delay is the first dimension and Doppler is the second dimension:

$$R[k, l] = K_\phi \sqrt{F_s T_c N_c}\, \delta\left(k-\frac{v}{\lambda}T_c N_c, l-\beta T_c t_0\right), \quad (6)$$

where $\beta$ is the slope, $\lambda$ is the wavelength, $T_c$ is the period or duration of the chirp, $F_s$ is the sampling rate at the receiver, v is the velocity, $N_c$ is a total number of the chirps over which varying the parameters is performed, k is the Doppler bin index, l is the time-delay bin index, and $\delta$ is the dirac-delta function. Thus, a target with a time-delay of $t_0$ and relative velocity of v may result in a peak that appears in the bin v/λT$_c$N$_c$ in the Doppler dimension and βT$_c$t$_0$ in the time-delay dimension.

In one example, a constant false alarm rate (CFAR) detector 750 may be used to detect which bins have peaks in the Doppler-time delay grid 740. For example, for a peak detected by the CFAR in the bin [k,l], where k indicates a Doppler peak and l indicates a time delay peak, the distance peak and the Doppler peak may be calculated using the following formula:

$$(\text{Distance, Doppler}) = \left(\frac{c}{2\beta T_c}l, \frac{1}{N_c T_c}k\right), \quad (7)$$

where T$_c$ is the period or duration of the chirp, B is the frequency range, v is the velocity, k is the Doppler bin index, l is the time-delay bin index, and c is the speed of light. If multiple antennas in the azimuth dimension are used, then a three-dimensional (3D) graph may be generated, where azimuth may be a third dimension. If multiple antennas in the elevation dimension are used, then a four-dimensional (4D) graph may be generated, where elevation may be a fourth dimension. Output from CFAR detector 750 may be used to create another time-delay-Doppler grid 755, marking training cells 760 guard cells 765, and a peak 770 in the Doppler and time-delay dimensions.

In some systems, interference may be randomized by varying the radar waveform being transmitted from chirp to chirp. According to various aspects, if a pattern of parameters is selected to vary the chirp slope and the frequency offset for each chirp, interference from other radar may be suppressed or shaped (e.g., offset). In some aspects, the FMCW waveform parameters may be varied less frequently than every chirp. For example, the waveform parameters may be varied for at least a subset of the N$_c$ chirps. Based on the way parameters are varied between different radar sources, two effects may occur: i) interference may be suppressed and/or ii) interference may be shaped. Shaping the interference may include time delaying and frequency shifting the interference beyond the range that may be detected by the receiver. By correctly choosing the parameters of the waveforms, the waveforms of coexistent radars may be orthogonalized such that they do not mutually interfere in a manner that affects target detection performance. Two parameters which may be used to shape or suppress interference may be the slope β and the frequency offset f$_0$, which may be two parameters that characterize the FMCW waveform. The patterns in which such parameters may be varied may be either random, or taken from a set of possible patterns (e.g., codebook) that are designed to ensure mutual interference is low. Some processing at the receiver may be used to coherently combine the received reflections of the chirps.

As discussed above, interference may be randomized by varying FMCW parameters for each chirp. Two waveform parameters that may be varied from chirp to chirp are the slope β and the frequency offset f$_0$. The following equation describes a received processed waveform r[m, n] after coherent detection, where the slope β and the frequency offset f$_0$ are varied with each chirp:

$$r[m, n] = K_\phi^{(m)} \exp\left(j2\pi\left(\frac{v}{\lambda}T_c N_c\right)\frac{m}{N_c}\right)\exp\left(j2\pi(\beta^{(m)}T_c t_0)\frac{n}{F_s T_c}\right), \quad (8)$$

where $K_\phi^{(m)} = \exp(-j\pi(\beta^{(m)}t_0 - f_0^{(m)})t_0)$, $\beta^{(m)}$ is the slope for the m$^{th}$ chirp, $f_0^{(m)}$ is the frequency offset for the m$^{th}$ chirp, m is the chirp index, λ is the wavelength, T$_c$ is the period or duration of the chirp, F$_s$ is the sampling rate at the receiver, v is the velocity of the target, N$_c$ is a total number of the chirps over which over which varying the parameters is performed, n is the sample index, and t$_0$ is the time offset of the target.

If varying slope and offset parameters, two parameters may be subject to additional receiver processing: (1) the phase term $K_\phi^{(m)}$, which may no longer be constant over the chirps and may vary from chirp to chirp (e.g., corresponding to the variations in the slope and frequency offset of the chirps), and (2) the phase-ramp corresponding to the time-delay (i.e. that depends on index n), which may also vary from chirp to chirp as the slope of the chirp varies. Thus, with varying waveform parameters, changes may be implemented in the receiver processing such that the desired signals may still be coherently combined using equalization and resampling. In one example, the desired signals may be the reflected target signals. The second exponential term may represent the time delay phase-ramp term, while the first exponential term may represent the Doppler phase-ramp term. Since the slope β and frequency offset f$_0$ may vary with the chirp m, the phase term $K_\phi^{(m)}$ may also vary with chirp index m. Because they may have different phases, different chirps may not be combined until they are equalized, where equalizing may account for the fact that the phase is not constant between chirps and may correct for phase variation from chirp to chirp. However, $K_\phi^{(m)}$ may also depend on the time-delay of the target and may not be known a priori at the receiver. Thus, equalization of the received waveform itself may not be possible. In some cases, however, it may be possible to equalize for $K_\phi^{(m)}$, a phase constant.

Figure 9:
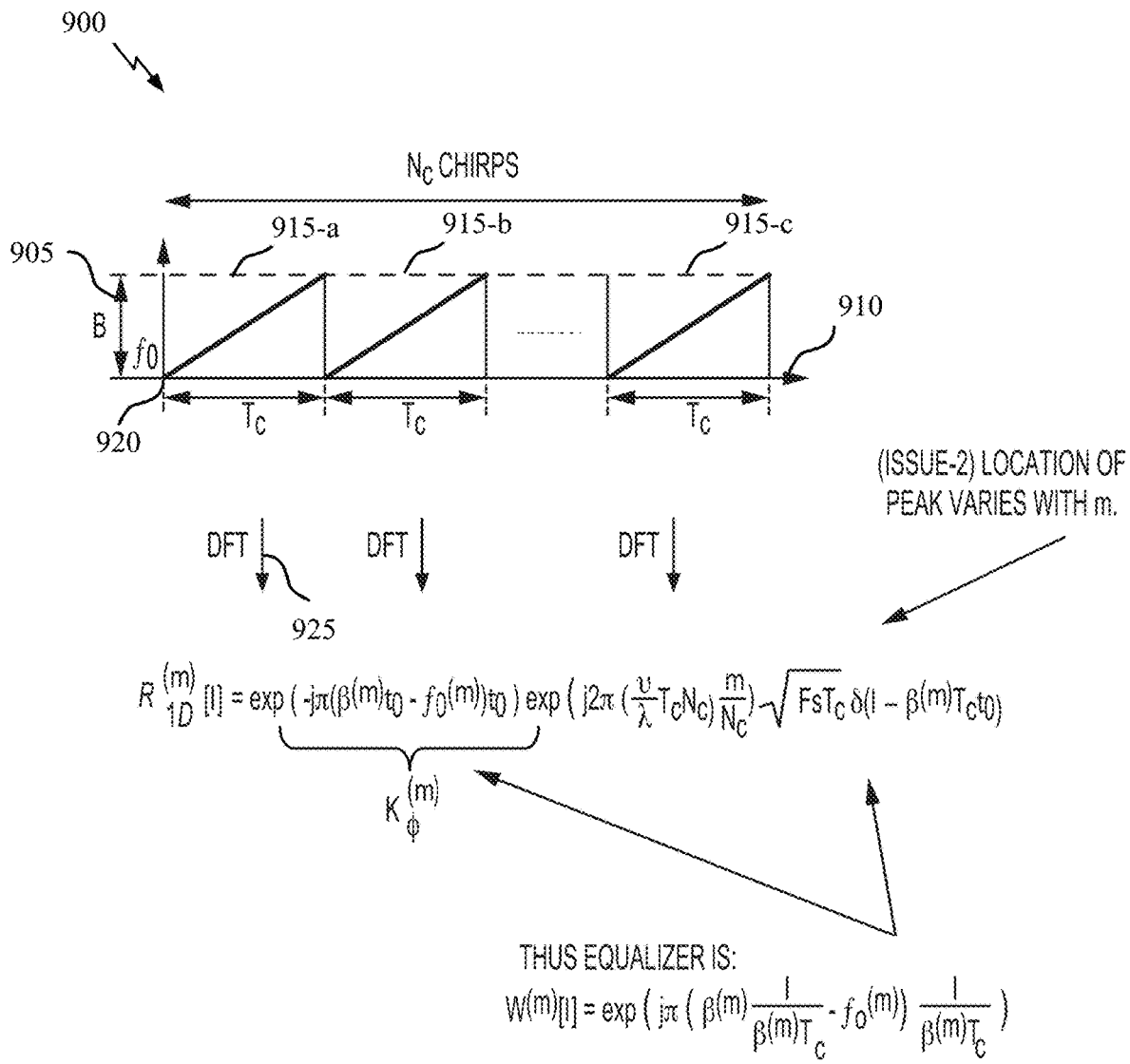
FIG. 9 illustrates an equalization process in accordance with aspects of the present disclosure.

FIG. 9 depicts an equalization process 900 in accordance with aspects of the present disclosure Equalization process 900 may be performed after a fast time delay DFT 925 (e.g., a DFT performed on a single chirp 915-a, 915-b, 915-c). Equalization process 900 may be performed on one or more chirps 915 (e.g., chirps 915-a, 915-b, 915-c, etc.) received in a time dimension 910 and having a same frequency range 905 and frequency offset 920. In one example, $K_\phi^{(m)}$ may be equalized for each time t$_0$ irrespective of whether there may be an existing path or not. In such cases, the noise statistics may remain unchanged, and the signal may be coherently combined by a second DFT (e.g., a slow time DFT).

The following equations (e.g., equations 8 and 9) describe an equalizer that may be used (e.g., in equalization process 900) to equalize for the variation of phase over m:

$$W^{(m)}[l] = \exp\left(j\pi\left(\beta^{(m)}\frac{l}{\beta^{(m)}T_c} - f_0^{(m)}\right)\frac{l}{\beta^{(m)}T_c}\right), \quad (9)$$

where slope $\beta^{(m)}$ is the slope for the m$^{th}$ chirp, $f_0^{(m)}$ is the frequency offset for the m$^{th}$ chirp, m is the chirp index, l is the time-delay peak, $W^{(m)}$ is the equalizer for the mth chirp, and T$_c$ is the duration of a chirp. After the fast DFT is executed for a chirp, the received reflected signal may be processed using $W^{(m)}[l]$. It is noted that the target peak of the processed signal may vary with the chirp index m. The following equation discloses a phase term $K_\phi^{(m)}$, which may vary from chirp to chirp and may be equalized before the reflections from the chirps are added up:

$$R_{1D}^{(m)}[l] = K_\phi^{(m)} \exp\left(j2\pi\left(\frac{v}{\lambda}T_cN_c\right)\frac{m}{N_c}\right)\sqrt{F_sT_c}\,\delta(l-\beta^{(m)}T_ct_0), \quad (10)$$

where $K_\phi^{(m)} = \exp(-j\pi(\beta^{(m)}t_0-f_0^{(m)})t_0)$, m is the chirp index, $\beta^{(m)}$ is the $m^{th}$ slope, $\lambda$ is the wavelength, $T_c$ is the period or duration of the chirp, $F_s$ is the sampling rate at the receiver, v is the velocity, $N_c$ is a total number of the chirps over which the waveform parameters are varied, k is the Doppler bin index, l is the time-delay bin index, $\delta$ is the dirac-delta function, and $t_0$ is the time offset of the target.

Equalization and resampling may take place after fast time DFT processing 925 at the receiver. The location of the interference peak after a fast time DFT 925 may depend on the slope β for a given chirp 915. In some cases, an equalization process 900 and resampling may be performed using an assumption that there is no change in sampling rate. Delay resolution and maximum delay may thus vary every chirp 915 (depending on chirp slope variation), as further described with reference to FIG. 10. After applying a fast time DFT 925, resampling and zero appending may be applied to a slope β of the processed reflected radar waveforms. For example, for chirp m with $\beta^{(m)}=2\beta$, the resampling processing may entail keeping every even sample of the fast time DFT 925 output that leads to a vector of half the length of the original fast time DFT 925 output, and appending zeros at the end to get back to an original size of the vector.

Figure 11:
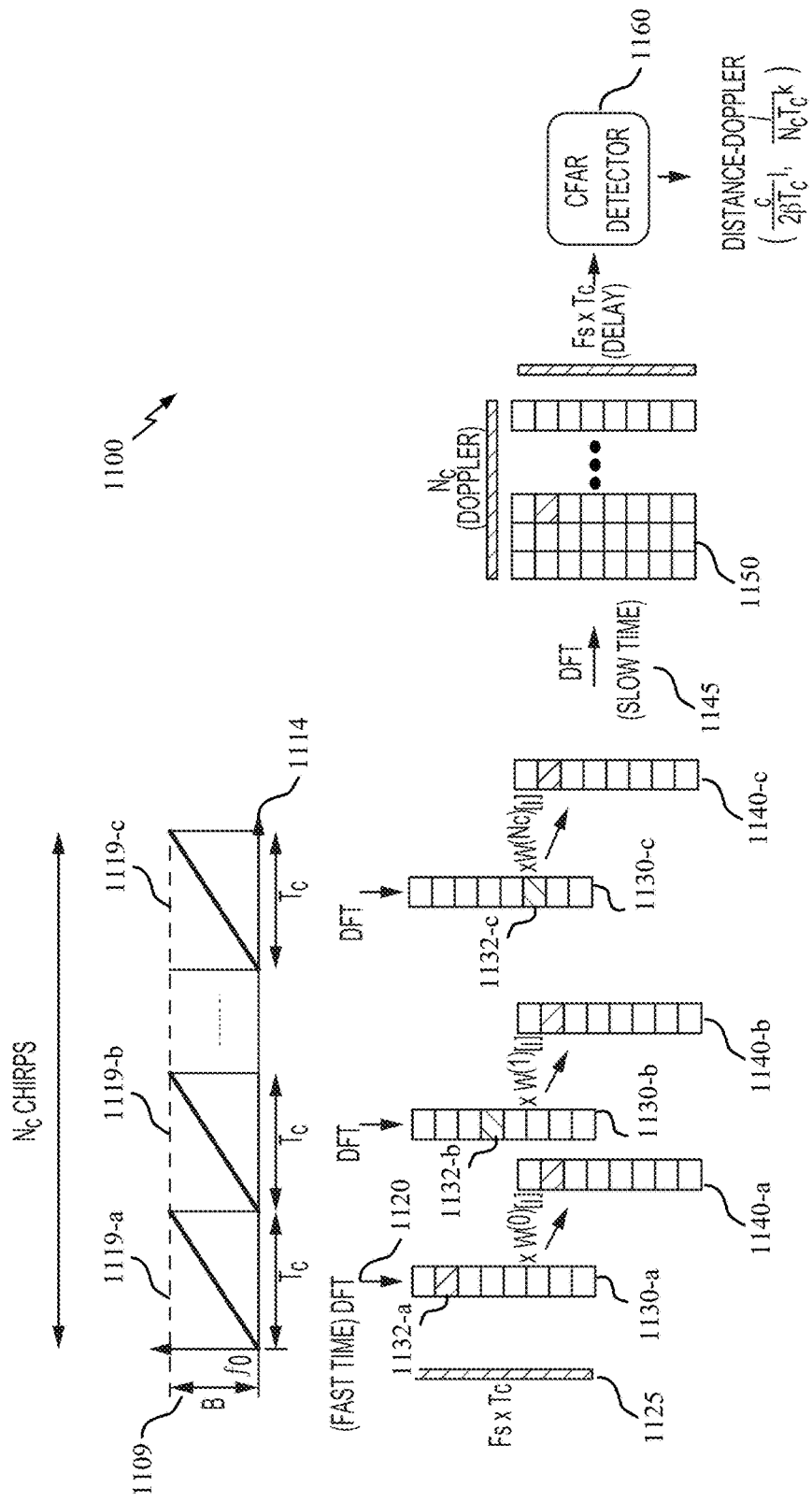
FIG. 11 illustrates an example of receiver processing in accordance with aspects of the present disclosure.

FIG. 11 illustrates receiver processing 1100 for target detection to accommodate for waveform parameters that are varying from chirp to chirp in accordance with aspects of the present disclosure, where equalization and resampling may be performed after a fast time DFT 1120, A UE 120 may receive multiple reflected chirps 1119 (e.g., 1119-*a*, 1119-*b*, 1119-*c*, etc.) in a time domain 1114, where the reflected chirps 1119 may have a same frequency range 1109. After performing the fast time DFT 1120, peaks 1132 may be located in bins in a time-delay grid 1130 (e.g., time-delay grids 1130-*a*, 1130-*b*, 1130-*c*, etc.) having a grid size 1125 of $F_s \times T_c$. The location of the peaks 1132 in each time-delay grid 1130 may depend on the actual waveform parameters used. In one example, a first time delay grid 1130-*a* may have a peak 1132-*a* in bin 2, a second time delay grid 1130-*b* may have a peak 1132-*b* in bin 3, and a third time-delay grid 1130-*c* may have 1132-*c* a peak in bin 6 (e.g., peaks may be represented by a cross hatched bin).

To account for the variation in bin location, equalization and resampling may be performed after fast time DFT processing 1120 at the receiver. The purpose of the resampling may be to align all the fast time DFT 1120 chirp outputs (e.g., from 0 through $N_c$) to the same time-delay bin. The equalization may be performed to ensure that the outputs of the fast time DFTs 1120 have a same phase, where the phases may be aligned, Once the outputs (e.g., time-delay grids 1130) of the fast time DFTs 1120 are equalized and resampled (e.g., in time-delay grids 1140), the outputs may be passed to the slow time DFT 1145, which may ensure that the target peaks are placed in a correct time-delay bin. For example, if a preferred bin exists for a target peak and the target peak occurs within a bin that is not the preferred bin, the waveform parameters may be changed until the peak appears in the preferred bin. Slow time DFT 1145 may create a time-delay-Doppler grid 1150. As described above with reference to FIG. 7, a CFAR detector 1160 may be applied to time-delay-Doppler grid 1150.

Figure 10:
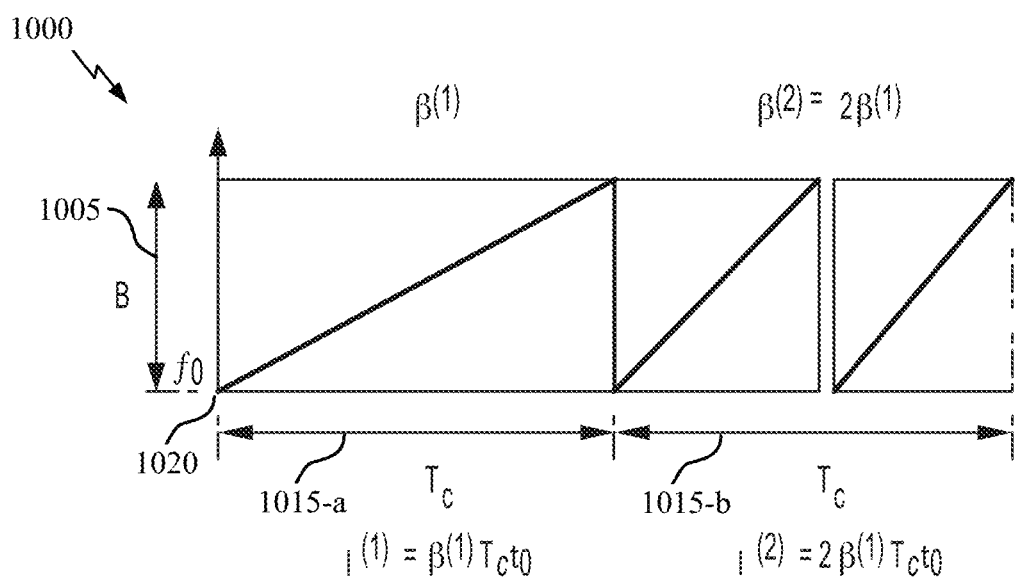
FIG. 10 illustrates a resampling process in accordance with aspects of the present disclosure.

FIG. 10 illustrates a resampling process 1000 in accordance with aspects of the present disclosure. Resampling process 1000 may be performed on one or more chirps received over time periods 1015 (e.g., having a duration of $T_c$). In one example, a first chirp received in time period 1015-*a* may have a slope of $\beta^{(1)}$ and may have a peak located within a delay bin at a value of $\beta^{(m)}T_ct^{(0)}$. Second chirp (e.g., received in time period 1015-*b*) may be transmitted with twice the slope, $\beta^{(2)}=2\beta^{(1)}$ and may have a peak located within a delay bin at a value of $2\beta^{(1)}T_ct^{(0)}$. Due to the doubling of the slope, the second chirp may be sampled every other bin (e.g., bin 0, bin 2, bin 4, and so on). Therefore, the second chirp may be resampled to every even bin (e.g., due to its doubling of slope compared to the first chirp), such that the target peak for the second chirp appears at the same bin as the first chirp. Zeros may be appended such that the resampled fast time DFT outputs of each chirp are the same size. In some cases, if doubling the slope, β, the same B Hz (e.g., frequency range 1005) may be covered in half the time and resampling (e.g., sampling even bins and discarding odd bins) may result in a common slope β.

An impact from an interfering radar signal at a mismatched receiver may occur for a given chirp and for a set of chirps. The interfering signal may have a different slope β and frequency offset $f_0$ than the target (e.g., reflected) signal. For example, for a given chirp, the frequency offset $f_0$ and/or the slope β may vary between the interfering and target signals.

A mismatch in the frequency offset $f_0$ and a match in the slope β between the target and interfering signals may lead to a shift of an interference peak in the time-delay domain. In one example, the interference peak may be shifted outside a range of interest. The following equation describes processing at a mismatched receiver:

$$R[k,l] = \quad (11)$$
$$K_\phi \sqrt{F_sT_cN_c}\,\delta\left(k-\left(\frac{v}{\lambda}+\frac{f_0-f_0'}{2}\right)T_cN_c, l-\left(\beta t_0-\frac{f_0-f_0'}{2}\right)T_c\right),$$

where l is the time delay peak, k is the Doppler peak, β is the slope of the desired and interfering radar, $f_0$ is the frequency offset of the desired radar, $f_0'$ is the frequency offset of the interfering radar, λ is the wavelength, $T_c$ is the period or duration of the chirp, $F_s$ is the sampling rate at the receiver, v is the relative velocity, $N_c$ is a total number of the chirps over which over which varying the parameters is performed, n is the sample index, $t_0$ is the time offset, and δ is the dirac-delta function.

For a given chirp, a mismatched slope β along with a matched or mismatched frequency offset $f_0$ between the target and interfering signals may cause interference energy to spread in the time-delay domain, which in one example, may behave like noise and distribute over the time-delay domain. If aggregating over multiple chirps (e.g., due to slow time DFT processing), chirps with mismatched frequency offset and matched slopes may distribute the interference peak over the Doppler domain, but may stay at a same offset in time-delay domain.

Figure 12:
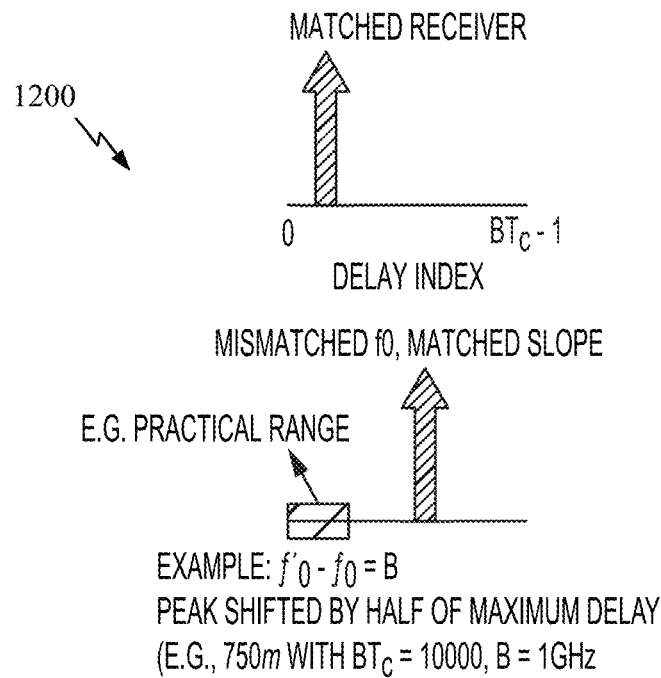
FIG. 12 illustrates an example is an example of the impact to an interfering radar signal at a mismatched receiver.
Figure 12:
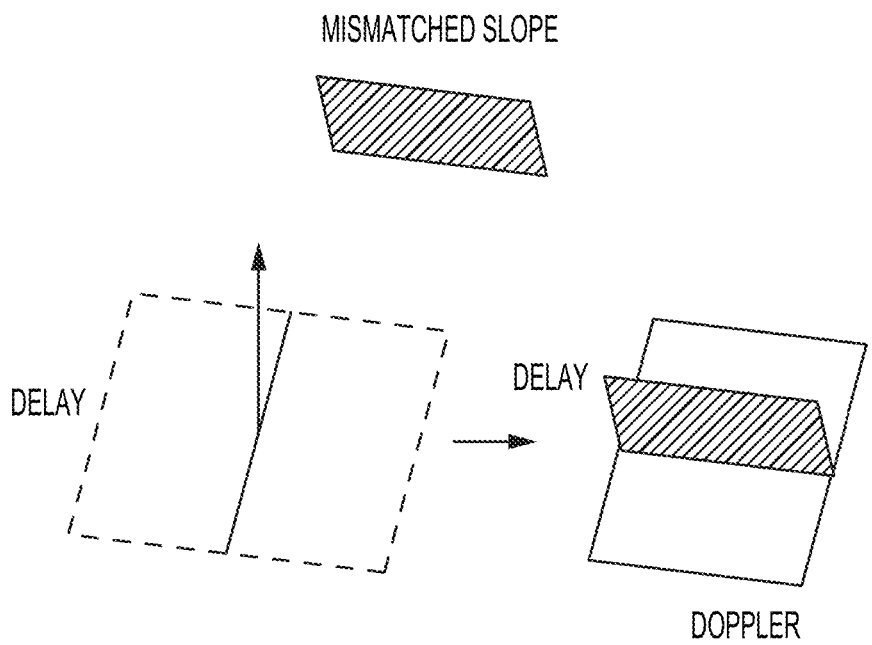

FIG. 12 shows an example 1200 for one chirp for which the interference peak is located in a time-delay bin, but when multiple chirps are aggregated, the interference is spread in the Doppler domain. The interference peak is indicated by an arrow in FIG. 12 for a single chirp and is shown by a cross hatched rectangle in FIG. 12 which shows that the energy of chirps with a matched slope and mismatched frequency offset is spread in the Doppler domain when multiple chirps are aggregated. The peak remains in the same time-delay bin, but is further spread over the Doppler dimension. The time-delay bin where the interference peak is shifted depends on the value of the frequency offset. Similarly, aggregating over multiple chirps (e.g., due to slow time DFT processing), chirps with mismatched slope and matched or mismatched frequency offset will lead to spreading the interference energy over the Doppler-time delay dimensions.

Certain choices of slope and frequency offset waveform parameters may lead to a transmit FMCW waveform which resembles a Zadoff-Chu sequence (ZC) as shown in the equations below (e.g., assuming Nyquist sampling). In the equations below, the slope and frequency offset of the chirp may be determined using two parameters, u, and q, for a given chirp.

$$x[m, n] = \exp\left(-j\pi\left(\beta^{(m)}\left(mT_c + \frac{n}{B}\right) + f_0^{(m)}\right)\left(mT_c + \frac{n}{B}\right)\right) \quad (12)$$

$$= \exp(-j\pi(u^{(m)}Bm + f_0^{(m)})T_c m)$$

$$\exp\left(-j\pi(u^{(m)}n + f_0^{(m)}T_c)\frac{n}{BT_c}\right)$$

$$\exp(-j2\pi u^{(m)}mn)$$

$$= (-1)^{(\cdot)}\exp\left(-j\pi u^{(m)}\frac{(n+1+2q^{(m)})n}{BT_c}\right),$$

where m is the chirp index, n is the sample index within the chirp, $T_c$ is the period of the chirp, B is the frequency range, $\beta^{(m)}$ is the slope, $f_0^{(m)}$ is the frequency offset for the $m^{th}$ chirp, $(u^{(m)}, q^{(m)})$ are the two parameters for the re chirp that determine the FMCW waveform such that it resembles a Zadoff-Chu sequence, and $(-1)^{(\cdot)}$ is a phase term that equals 1 if $BT_c$ is even or equals $(-1)^{(m)}$ if $BT_c$ is odd and does not change Zadoff-Chu sequence form for a given chirp.

In the equations below, the slope for chirp in may be selected as $\beta^{(m)}=u^{(m)}\times B/T_c$ and the frequency offset may be selected as $f_0^{(m)}=u^{(m)}\times(1+2q^{(m)})/T_c$, such that the chirp slope and frequency offset satisfy the following parameterization:

$$(\beta^{(m)}, f_0^{(m)}) = \left(u^{(m)}\frac{B}{T_c}, u^{(m)}\frac{1+2q^{(m)}}{T_c}\right), \quad (13)$$

where m is the chirp index, where $T_c$ is the period of the chirp, B is the frequency range, $\beta^{(m)}$ is the slope, $f_0^{(m)}$ is the frequency offset for the $m^{th}$ chirp, and $(u^{(m)}, q^{(m)})$ are the two parameters for the $m^{th}$ chirp that determine the FMCW waveform such that it resembles a Zadoff-Chu sequence, and may be referred to as Zadoff-Chu parameters. Based on the Zadoff-Chu parameters, u and q, the Zadoff-Chu waveform may change in response to the slope β and the frequency offset $f_0$. By selecting the chirp slopes and frequency offsets in this manner, the resulting waveform, which may resemble a Zadoff-Chu waveform, may have useful properties for suppressing interference and shaping interference, as described herein.

In some cases, the parameters $(u^{(m)}, q^{(m)})$ can be chosen such that interference between coexistent radar may be suppressed by utilizing the correlation properties of Zadoff-Chu waveforms. A Zadoff-Chu sequence may produce an electromagnetic signal of constant amplitude if applied to radio signals, whereby cyclically-shifted versions of the sequence imposed on a signal result in zero correlation with one another at the receiver. The "root sequence" may be a generated Zadoff-Chu sequence that has not been shifted. These sequences may exhibit a property that cyclically-shifted versions of a root sequence are orthogonal to one another, provided that each cyclic shift, if viewed within the time domain of the signal, is greater than the combined multi-path delay-spread and propagation delay of that signal between the transmitter and receiver. In some cases, u may be referred to as the Zadoff-Chu (Zadoff-Chu) root parameter or root parameter of the Zadoff-Chu sequence, while q may be referred to as the Zadoff-Chu shift parameter or shift parameter of the Zadoff-Chu sequence.

In some aspects, a phase modulation may be applied to the FMCW waveform as shown below. A phase code sequence may be applied to the FMCW waveform, $x_{FMCW}[m, n]$, where the phase code may follow a Zadoff-Chu sequence:

$$x[m.n] = x_{FMCW}[m, n]\exp\left(-j\pi\bar{u}\frac{(m+1+2\bar{q})m}{N}\right), \quad (14)$$

where m is the chirp index from 1 to $N_c$, $N_c$ is the number of chirps, $N \le N_c$ is the length of the phase-code and may be constrained to be the largest prime number less than or equal to $N_c$, n is the sample index within the $m^{th}$ chirp, and $(\bar{u},\bar{q})$ control the phase-modulation applied across $N_c$ chirps by the Zadoff-Chu sequence. The phase modulation applied here may be based on a Zadoff-Chu sequence and may be determined by choice of the parameters $(\bar{u},\bar{q})$. As described above, the slope and frequency offset parameters of the FMCW waveform may also be varied over a subset of the chirps m=1, 2, . . . , $N_c$ such that the waveform follows a Zadoff-Chu sequence. In such a case, the transmitted waveform may resemble two nested Zadoff-Chu sequences: the original FMCW waveform where every chirp resembles a Zadoff-Chu sequence (e.g., based on a certain choice of parameters), and a Zadoff-Chu representing phase modulation. The Zadoff-Chu sequence representing a phase sequence being applied to the FMCW waveform may help suppress interference of two waveforms by preventing the waveforms from adding coherently.

Zadoff-Chu sequences may have useful properties for suppressing interference and shaping interference. Interference may be suppressed for chirps that differ in slope. If two UEs i and j are both transmitting and $u_i^{(m)} \ne u_j^{(m)}$, then the cross correlation for the two Zadoff-Chu sequences for i and j may be a low value. If $u_i^{(m)} \ne u_j^{(m)}$, then the cross correlation among the Zadoff-Chu sequences raises the noise floor, where there are two radar transmitters for i and j. In one example i and j may use different slopes, $u_i^{(m)}$ and $u_j^{(m)}$, on the $m^{th}$ chirp, which may lead to a cross correlation of the two sequences which is limited by the length of the Zadoff-Chu sequence. Therefore, the interference may be suppressed because of the low cross correlation amongst the two Zadoff-Chu sequences. The correlation amongst the two Zadoff-Chu sequences may raise the noise floor, which means the two sequences may not be completely orthogonal. As such, the cross correlation may be small, but not zero, and the interference may be spread with a low energy which appears as noise. With mismatched slopes (e.g., parameter u), cross-correlation $\sqrt{BT_c}$ may be constant such that any time delay energy may be spread uniformly in the time delay dimension. The interference may be suppressed by the length of the Zadoff-Chu sequences, such that the interference may appear as suppressed noise which raises the noise floor (e.g., instead of appearing as a ghost target). Using a different set of u (e.g., root parameter), and q (e.g., shift parameter), as parameters for different Zadoff-Chu sequences may therefore lead to interference suppression.

In another example, the slopes, u, of the $i^{th}$ and $j^{th}$ transmitters may be matched. For example, the interference may be shaped by setting frequency offsets such that ghost targets or interference peaks appear beyond a range of interest. If $u_i^{(m)} = u_j^{(m)}$, that is, the root Zadoff-Chu parameter of the $i^{th}$ transmitter for the $m^{th}$ chirp is equal to the root Zadoff-Chu parameter of the $j^{th}$ transmitter for the $m^{th}$ chirp, the peak interference may be shifted relative to $(q_i^{(m)} - q_j^{(m)})$. The shift may therefore be represented by the difference between the Zadoff-Chu q (e.g., shift) parameter of the $i^{th}$ transmitter for the $m^{th}$ chirp and the Zadoff-Chu q (e.g., shift) parameter of the $j^{th}$ transmitter for the $m^{th}$ chirp. Therefore, if root Zadoff-Chu parameters for the $i^{th}$ and $j^{th}$ transmitters are the same, the interference peak may be shifted based on the difference between shift Zadoff-Chu parameters for the $i^{th}$ and $j^{th}$ transmitters $(q_i^{(m)} - q_j^{(m)})$. If the value of the q Zadoff-Chu parameters are close to each other, then the peak may be shifted by more than if the parameters were farther apart.

In one example, the peak interference may be set to be greater than the range of interest, where m is the $m^{th}$ chirp and i, j are radar transmitters. For example, a radar may target a range of 150 meters, may transmit over a bandwidth of 1 GHz, may receive with a sampling rate of 1 GHz, and may have a chirp duration $T_c$ of 10 micro-seconds. As such, if a root Zadoff-Chu parameter of the $i^{th}$ transmitter for the $m^{th}$ chirp is equal to the root Zadoff-Chu parameter of the $i^{th}$ transmitter for the $m^{th}$ chirp, where $u_i^{(m)} = u_j^{(m)} = 1$, the difference between the shift Zadoff-Chu parameters for the $i^{th}$ and $j^{th}$ transmitters $(q_i^{(m)} - q_j^{(m)})$ may be set between a frequency offset of [1000 Hz, 9000 Hz] such that mutual interference between the $i^{th}$ and $j^{th}$ transmitters will appear at a distance greater than 150 meters, which may be beyond the range expected from any target reflected signals. Therefore, if the root Zadoff-Chu parameter $u^{(m)}$ for chirp m for radar transmitters i and j are the same, the q, or shift, Zadoff-Chu parameters $q_i^{(m)}$ and $q_j^{(m)}$ for radar transmitters i and j for the $m^{th}$ chirp can be selected so the peak of the interference may be shifted beyond a range of interest. In one example, if the radar transmitters are next to each other, the energy from each other may still appear far from each other and not as interference within the range of interference. Therefore, matched slopes u and mismatched offsets, q, may cause an autocorrelation between transmitters i and j such that the interference peaks may be delayed relative to mismatches in q.

In one example, aggregation may occur over multiple chirps with varying slope $u^{(m)}$, and frequency offset $f^{(m)}$. For chirps with mismatched slopes $u_i^{(m)} \neq u_j^{(m)}$, the interference energy (e.g., caused by the cross correlation amongst Zadoff-Chu FMCW waveforms) may be distributed evenly in the Doppler-time delay (e.g., 2D) dimension. For chirps with matched slopes u (e.g., of the $i^{th}$ and $j^{th}$ transmitters for the $m^{th}$ chirp) and unmatched q, of the $i^{th}$ and $j^{th}$ transmitters for the $m^{th}$ chirp (e.g., $u_i^{(m)} = u_j^{(m)}$ and $q_i^{(m)} \neq q_j^{(m)}$), the interference may be distributed over the Doppler dimension for delay related to the difference between the frequency offset of the $i^{th}$ and $j^{th}$ transmitter for the $m^{th}$ chirp (e.g., $(q_i^{(m)} - q_j^{(m)})$).

In some cases, the choice of values for the root u and the shift q parameters of the Zadoff-Chu sequence may be limited if using FMCW as the waveform due to changes used on the receiver side in order to process the varying the parameters. In other words, the number of root u and shift q parameter values ($u^{(m)}$, $q^{(m)}$) may limited (e.g., just a small set of "orthogonal users" may be possible), where $u^{(m)}$) is the root parameter on the $m^{th}$ chirp and $q^{(m)}$ is the shift parameter on the $m^{th}$ chirp. Due to the receiving processing (e.g., resampling) several values for the root Zadoff-Chu parameter may be used without impacting system performance on the receiver end. For example, $u^{(m)} \in \pm[1,2]$, such that $u^{(m)}$, the u or root parameter on the $m^{th}$ chirp, may be either 1 or 2. Values other than 1 or 2 may be used for $u^{(m)}$, but resolution performance may be impacted, (e.g., if assuming the sampling rate at the receiver is kept constant to coherently combine $N_c$ chirps). For example, resolution performance for $u^{(m)} = 3$ may be 30 centimeters (cm), while resolution performance for $u^{(m)} = 1$ may be 10 cm (e.g., assuming the receiver sampling rate, number of chirps, and the chirp duration (despite the slope increase) remains the same). Further, resolution performance for $u^{(m)} = 2$ is half that for $u^{(m)} = 1$. Therefore, in one example, $u^{(m)}$ may be limited to $\pm 1$ or $\pm 2$.

Further, to meet the maximum range specifications where the interference lies outside the range of interest, several values for q may be practical for the same Zadoff-Chu root parameter u, where $u^{(m)}$ is the root parameter on the $m^{th}$ chirp and $q^{(m)}$ is the shift Zadoff-Chu parameter on the $m^{th}$ chirp. In one example, values for q may be selected such that the interference lies outside the maximum range specifications. For example, $$(q_i^{(m)} - q_k^{(m)}) \in \{0.2, 0.4, 0.6, 0.8\} \frac{BT_c}{u},$$

where $q_i^{(m)}$) is the shift Zadoff-Chu parameter of the $i^{th}$ transmitter for the $m^{th}$ chirp, $q_k^{(m)}$ is the shift Zadoff-Chu parameter of the kth transmitter for the $m^{th}$ chirp, $T_c$ is the period of the chirp, B is the frequency range, and u is the Zadoff-Chu root parameter. The set of chirps with parameters $u_i^{(m)} = u_j^{(m)}$, $q_i^{(m)} = q_j^{(m)}$ may add coherently, where ($u_i^{(m)}$, $q_i^{(m)}$) are the root and shift parameters of a Zadoff-Chu sequence that determine the slope and offset of the FMCW waveform being transmitted by $i^{th}$ transmitter for the $m^{th}$ chirp, and ($u_j^{(m)}$, $q_j^{(m)}$) are the root and shift parameters of a Zadoff-Chu sequence that determine the slope and offset of the FMCW waveform being transmitted by the $j^{th}$ transmitter for the $m^{th}$ chirp.

As discussed earlier, in some aspects, every chirp may use a FMCW waveform that may vary the waveform parameters from chirp-to-chirp to mitigate mutual interference. However, as the number of proximal vehicle radar users increases, the number of chirps that interfere may also increase. In order to prevent the number of FMCW waveforms of different UEs 120 from adding coherently, a phase code may be added on top of the FMCW waveform (e.g., phase-coded FMCW waveform), Thus, to suppress interference, the waveform parameters may be varied for at least a subset of the $N_c$ chirps (e.g., a waveform may be transmitted consisting of $N_c$ chirps) and the phase code may be applied such that the parameter variations and phase code differ among proximate automotive radar. In one example, the parameters being varied may be determined from a set of possible patterns e.g., codewords), where a pattern of parameters (e.g., a chirp slope, a frequency offset, another waveform parameter, or a combination of any of these) may be called a codeword, and a set of patterns may be called a codebook. In some aspects, a codebook may include at least three different codewords, which may correspond to at least three different chirp slopes, at least three different frequency offsets, and/or at least three different pairs of chirp slopes and frequency offsets, for example.

In a phase-coded FMCW system, avoiding coherent addition of chirps with the same parameters may help suppress interference. In one example, 90% of the chirps may be orthogonal, (e.g., the parameters for each chirp may be selected such that interference between chirps is suppressed or shaped). In some cases, 10% of the chirps may still have the same parameters that may add up coherently. A phase code may therefore be added over the FMCW waveform to suppress or shape interference. The phase code may be based on a set of parameters that results in a low correlation Zadoff-Chu sequence (e.g., because every chirp has an associated phase and the phase varies from one chirp to another).

In this example, a set of chirps with $u_i^{(m)} = u_j^{(m)}$, $q_i^{(m)} = q_j^{(m)}$ may add coherently. Thus, phase code may be added on top of the FMCW to prevent the chirps from adding coherently, thereby suppressing interference. The Zadoff-Chu sequence shown below may be an example of the phase sequence being applied to the FMCW waveform, where the FMCW waveform is raised exponentially to the Zadoff-Chu sequence as shown below:

$$x[m, n] = x_{FMCW}[m, n] \exp\left(-j\pi \bar{u} \frac{(m+1+2\bar{q})m}{N}\right), \quad (15)$$

where here m is the chirp index with in =0, 1, ..., N, N is number of chirps and the length of the Zadoff-Chu sequence, n is the sample index within the $m^{th}$ chirp, and $\bar{u}$ and $\bar{q}$ control the phase-modulation applied across every one of the and are called phase modulation parameters. Adding a phase code may create two nested Zadoff-Chu sequences: the original FMCW waveform where every chirp resembles a Zadoff-Chu sequence and a Zadoff-Chu representing phase modulation. The Zadoff-Chu sequence used for the phase sequence being applied to the FMCW waveform may create interference suppression between two waveforms by preventing the interference from the waveforms from adding coherently.

The processing on the receiver end may also change such that desired signals may be coherently combined using equalization and resampling. In one example, parameters may be selected by choosing a codeword from a codebook, where each codeword represents a pattern of waveform parameters and each codebook contains multiple codewords of patterns. Specifically, a codeword may represent a pattern of parameters over $N_c$ chirps, where the codebook is a set of codewords with different patterns of parameters. Variations in parameters may be chosen from a codebook designed for low mutual interference among codewords. For example, if an vehicle shares its codeword of parameters with another vehicle through a sidelink, the other vehicle may select a codeword with parameters resulting in low mutual interference between the two vehicles.

As stated above, parameters may be selected by choosing a codeword from a codebook where the codebook may be designed to yield low mutual interference among other users in the system. If the pattern of parameters (e.g., codeword) used by one vehicle with transmitter i is known to a vehicle with transmitter j, the vehicle with transmitter j may select a codeword which produces the least mutual interference to the pattern of parameters used by the vehicle with transmitter i. In one example, the vehicle with transmitter i may first determine a set of patterns used by other vehicles in its proximity, and select a codeword for its own transmission that leads to the least mutual interference. Interference may be detected by observing a received signal or signal energy over the patterns of parameters in the codewords. The vehicle may choose a codeword that is most orthogonal (e.g., leads to minimum mutual interference) to detected codewords used in the proximity of the vehicle.

In one example, a codeword may contain a subset of the values for the parameters found in the following codeword parameter set:

$$\{\phi_i^{(m)}, c_i := (\beta_i^{(m)}, f_{0,i}^{(m)}), m=1, \ldots, N_c\}, \quad (16)$$

where $c_i$ is the set of parameters for the $i^{th}$ codeword that determine the slope and frequency offset of the FMCW waveform transmitted in chirp m, $\beta_i^{(m)}$ is the slope of the FMCW waveform of the $i^{th}$ codeword for the $m^{th}$ chirp, and $f_{0,i}^{(m)}$ is the frequency offset of the FMCW waveform of the $i^{th}$ codeword for the $m^{th}$ chirp, and where $\phi_i^{(m)}$ is the phase modulation applied for the $i^{th}$ codeword to the $m^{th}$ chirp, and where m is the chirp index, and $N_c$ is the total number of chirps over which over which varying parameters is performed.

In one example, codewords may contain values for the FMCW parameters found in the following codeword parameter set:

$$\{\bar{u}_i, \bar{q}_i, N, c_i := (u_i^{(m)}, q_i^{(m)}), m=1, \ldots, N_c\}, \quad (17)$$

where $u_i^{(m)}$ is the root Zadoff-Chu parameter of the $i^{th}$ transmitter for the $m^{th}$ chirp, $q_i^{(m)}$ is the shift Zadoff-Chu parameter of the $i^{th}$ transmitter for the $m^{th}$ chirp, $c_i$ is the set of parameters for the $i^{th}$ transmitter that determine the slope and frequency offset of the FMCW waveform transmitted in chirp m, m is the chirp index, $N_c$ is the total number of chirps over which over which varying parameters is performed, and ($\bar{u}_i$, $\bar{q}_i$, N) control the phase-modulation applied across $N_c$ chirps and may be called phase modulation parameters.

In one example, the parameters $\{\bar{u}_i, \bar{q}_i\}$ for the $i^{th}$ codeword may be chosen randomly with a uniform distribution within the range of interest of the parameters. In one example, the parameters $\{c_i := (u_i^{(m)}, q_i^{(m)}), m=1, \ldots, N_c\}$ for the $i^{th}$ codeword may be chosen such that interference between vehicle radar employing different codewords is suppressed or shaped or both, where $c_i$ is the set of parameters that control the slope and frequency offset of the $m^{th}$ chirp, $u_i^{(m)}$ is the slope parameter for the $m^{th}$ chirp, $q_i^{(m)}$ is the frequency offset parameter for the $m^{th}$ chirp, in is the chirp index, and $N_c$ is the total number of chirps over which the suppression of interference is performed.

Figure 13:
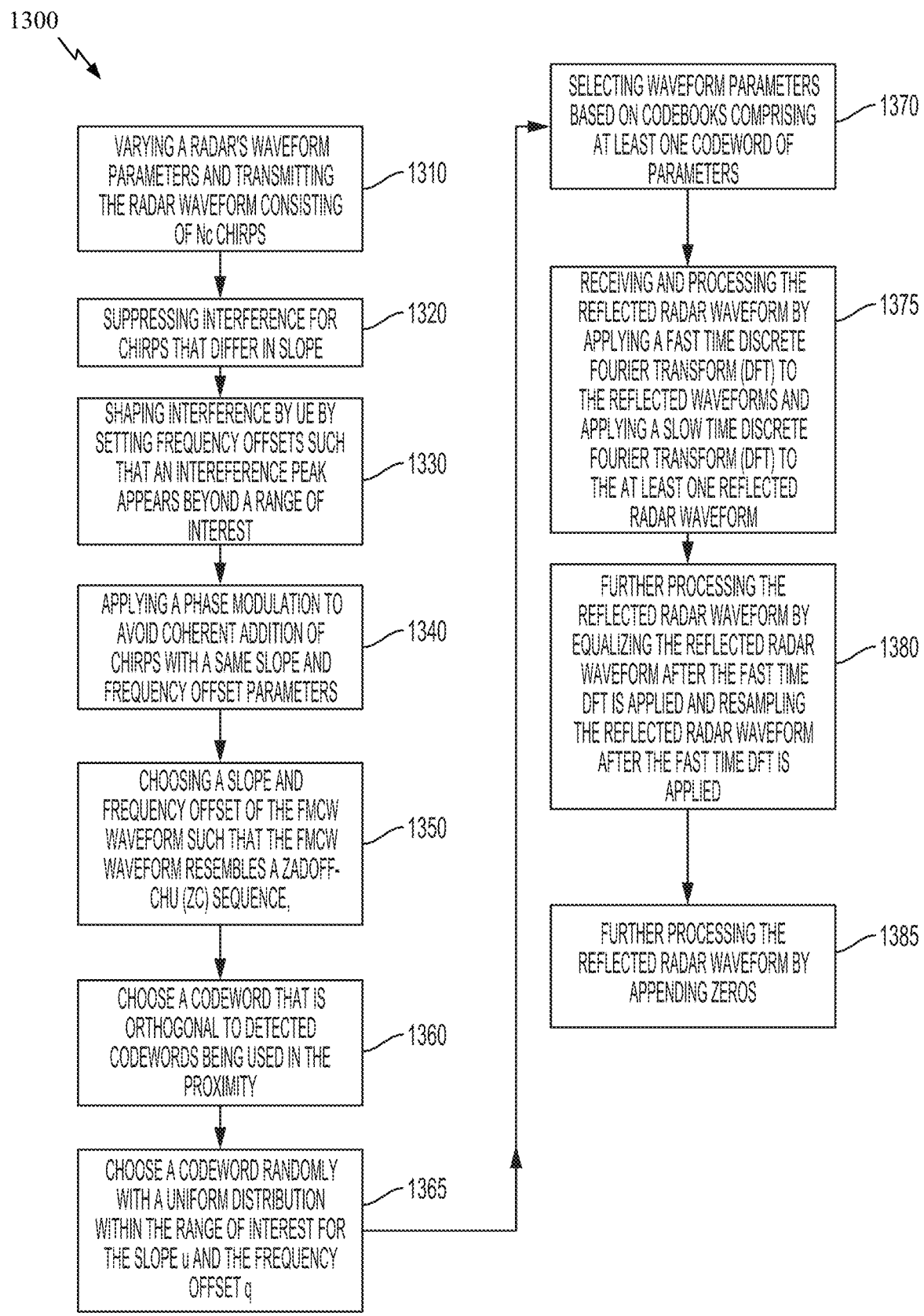
FIG. 13 shows a flowchart illustrating methods for selecting waveform parameters and processing reflected waveforms in accordance with aspects of the present disclosure.

FIG. 13 illustrates a process 1300 in accordance with aspects of the present disclosure. Process 1300 describes steps which may be taken by a UE 120 for selecting FMCW waveform parameters for multiple radar coexistence and for processing reflected radar waveforms (e.g., by equalizing and resampling the reflected radar waveforms).

At 1310, the UE 120 may determine to vary a radar's waveform parameters and transmit the radar waveform consisting of $N_c$ chirps.

At 1320, the UE 120 may suppress interference for chirps that differ in slope.

At 1330, the UE 120 may shape interference by setting frequency offsets such that an interference peak appears beyond a range of interest.

At 1340, the UE 120 may apply phase modulation to avoid coherent addition of chirps with a same slope and same frequency offset parameters.

At 1350, the UE 120 may choose a slope and frequency offset of the FMCW waveform such that the FMCW waveform resembles a Zadoff-Chu sequence.

At 1360, the UE 120 may choose a codeword that is orthogonal to detected codewords being used in proximity of the UE 120.

At 1365, the UE 120 may choose a codework randomly with a uniform distribution, within the range of interest for the slope u and the frequency offset q.

At 1370, the UE 120 may select waveform parameters based on codebooks including at least one codeword of parameters.

At 1375, the UE 120 may receive and process a reflected radar waveform by applying a fast time DFT to the reflected waveform and applying a slow time DFT to the reflected waveform.

At 1380, the UE 120 may further process the reflected radar waveform by equalizing the reflected radar waveform after the fast time DFT is applied. The UE 120 may also resample the reflected radar waveform after the fast time DFT is applied.

At 1385, the UE 120 may further process the reflected radar waveform by appending zeros.

Figure 14:
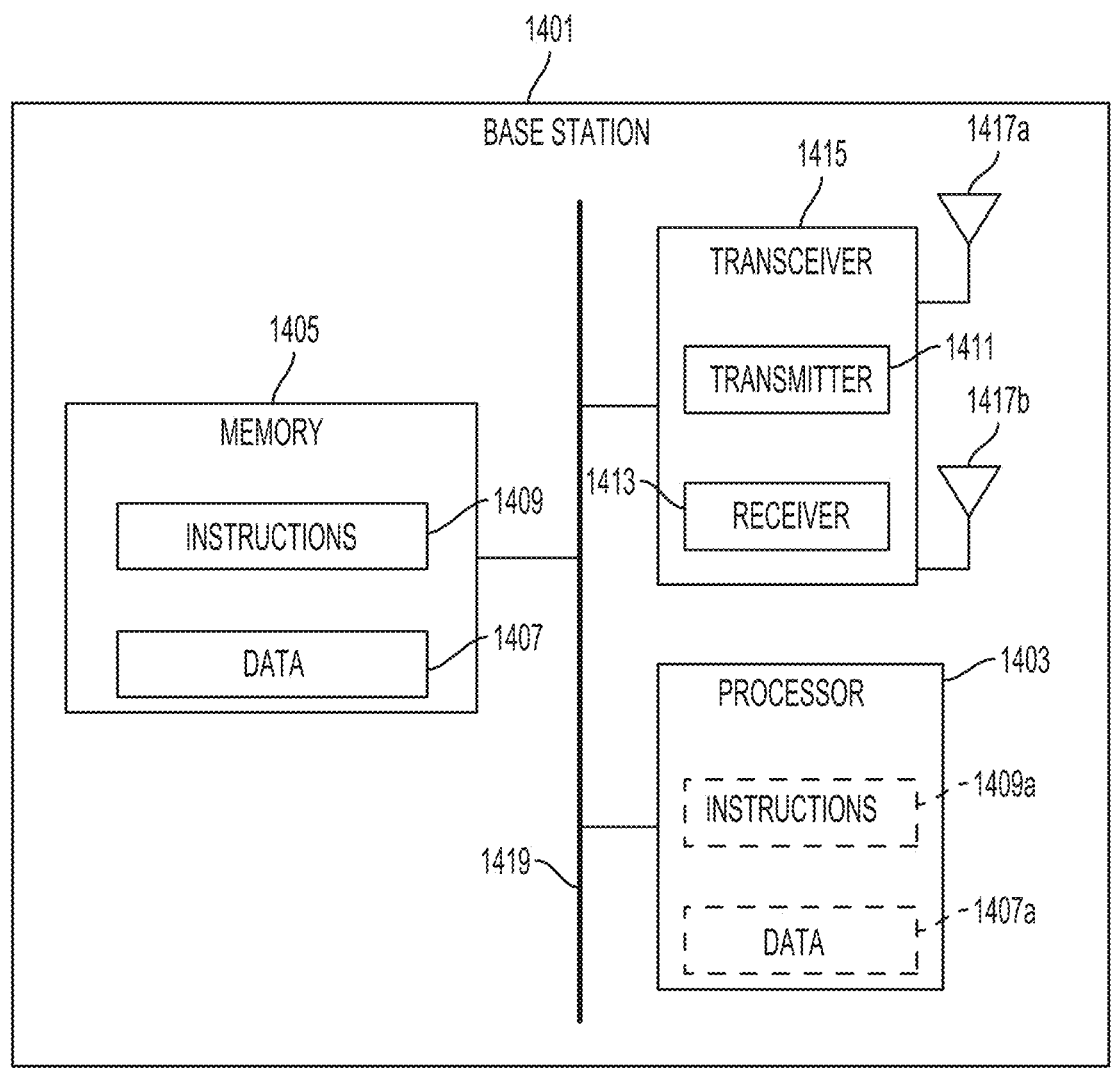
FIG. 14 illustrates certain components that may be included within a base station in accordance with aspects of the present disclosure.

FIG. 14 illustrates certain components that may be included within a base station 1401 in accordance with aspects of the present disclosure. The base station 1401 may be an access point, a NodeB, an evolved NodeB, etc. The base station 1401 includes a processor 1403. The processor 1403 may be a general purpose single- or multi-chip microprocessor (e.g., an ARM), a special purpose microprocessor (e.g., a digital signal processor (DSP)), a microcontroller, a programmable gate array, etc. The processor 1403 may be referred to as a central processing unit (CPU). Although just a single processor 1403 is shown in the base station 1401 of FIG. 14, in an alternative configuration, a combination of processors (e.g., an ARM and DSP) could be used.

The base station 1401 also includes memory 1405. The memory 1405 may be any electronic component capable of storing electronic information. The memory 1405 may be embodied as random-access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1407 and instructions 1409 may be stored in the memory 1405. The instructions 1409 may be executable by the processor 1403 to implement the methods disclosed herein. Executing the instructions 1409 may involve the use of the data 1407 that is stored in the memory 1405. When the processor 1403 executes the instructions 1409, various portions of the instructions 1409a may be loaded onto the processor 1403, and various pieces of data 1407a may be loaded onto the processor 1403.

The base station 1401 may also include a transmitter 1411 and a receiver 1413 to allow transmission and reception of signals to and from the wireless device 1401. The transmitter 1411 and receiver 1413 may be collectively referred to as a transceiver 1415. Multiple antennas 1417a-b may be electrically coupled to the transceiver 1415. The base station 1401 may also include (not shown) multiple transmitters, multiple receivers and/or multiple transceivers.

The various components of the base station 1401 may be coupled together by one or more buses, which may include a power bus, a control signal bus, a status signal bus, a data bus, etc. For the sake of clarity, the various buses are illustrated in FIG. 14 as a bus system 1419. Although FIG. 13, was discussed with reference to a UE, it should be understood that a base station, such as base station 1401, may perform the corresponding transmitting that is received and monitored by the UE as well as the receiving of the information indicated by the UE discussed in FIG. 13 and may be implemented in hardware, software executed by a processor like the processor 1403 described in FIG. 14.

Figure 15:
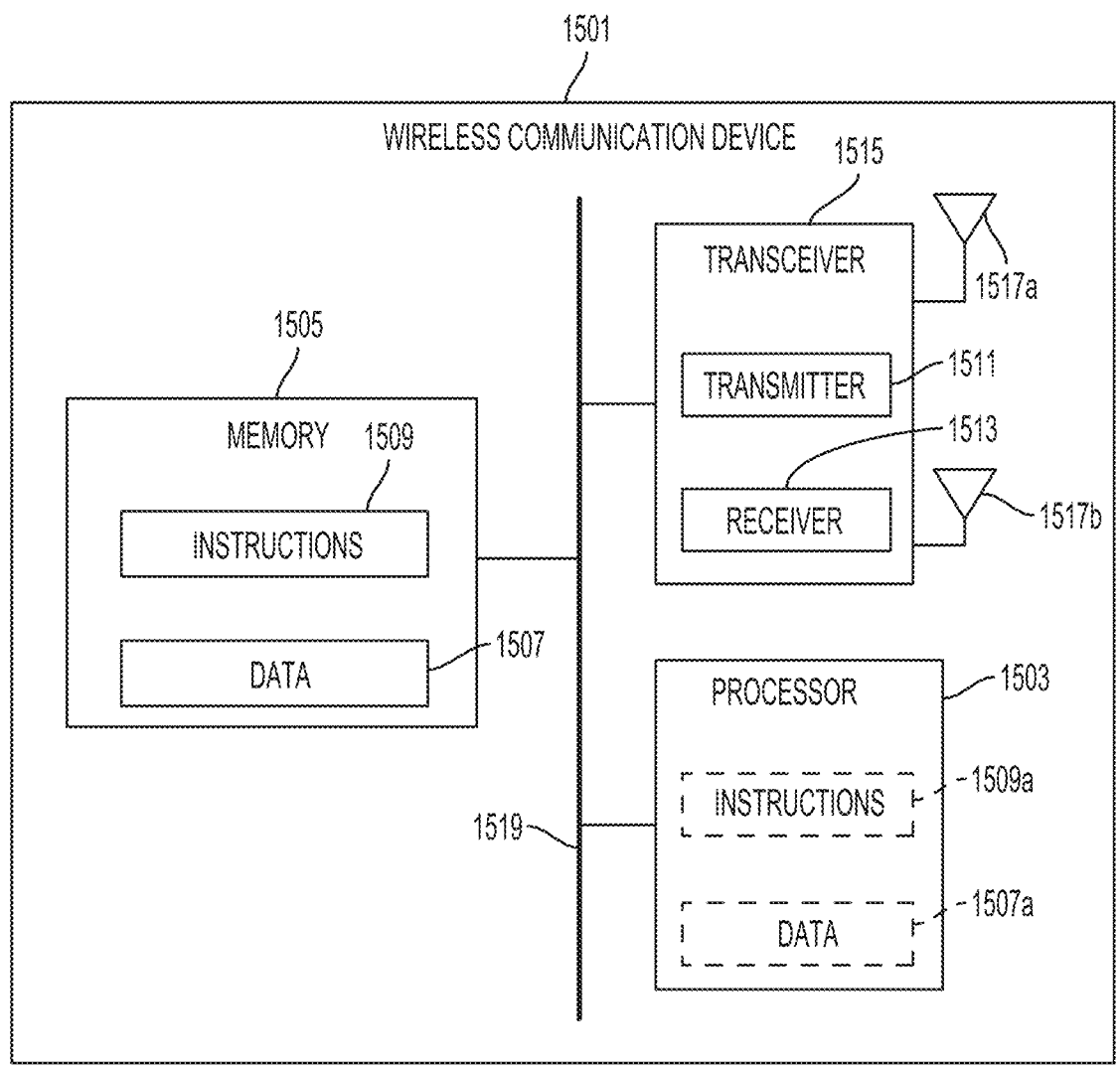
FIG. 15 illustrates certain components that may be included within a wireless communication device in accordance with aspects of the present disclosure.

FIG. 15 illustrates certain components that may be included within a wireless communication device 1501 in accordance with aspects of the present disclosure. The wireless communication device 1501 may be an access terminal, a mobile station, a user equipment (UE), etc. The wireless communication device 1501 includes a processor 1503. The processor 1503 may be a general-purpose single- or multi-chip microprocessor (e.g., an ARM), a special purpose microprocessor (e.g., a digital signal processor (DSP)), a microcontroller, a programmable gate array, etc. The processor 1503 may be referred to as a central processing unit (CPU). Although just a single processor 1503 is shown in the wireless communication device 1501 of FIG. 15, in an alternative configuration, a combination of processors (e.g., an ARM and DSP) could be used.

The wireless communication device 1501 also includes memory 1505. The memory 1505 may be any electronic component capable of storing electronic information. The memory 1505 may be embodied as random-access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1507 and instructions 1509 may be stored in the memory 1505. The instructions 1509 may be executable by the processor 1503 to implement the methods disclosed herein. Executing the instructions 1509 may involve the use of the data 1507 that is stored in the memory 1505. When the processor 1503 executes the instructions 1509, various portions of the instructions 1509a may be loaded onto the processor 1503, and various pieces of data 1507a may be loaded onto the processor 1503.

The wireless communication device 1501 may also include a transmitter 1511 and a receiver 1513 to allow transmission and reception of signals to and from the wireless communication device 1501. The transmitter 1511 and receiver 1513 may be collectively referred to as a transceiver 1515. Multiple antennas 1517a-b may be electrically coupled to the transceiver 1515. The wireless communication device 1501 may also include (not shown) multiple transmitters, multiple receivers and/or multiple transceivers.

The various components of the wireless communication device 1501 may be coupled together by one or more buses, which may include a power bus, a control signal bus, a status signal bus, a data bus, etc. For the sake of clarity, the various buses are illustrated in FIG. 15 as a bus system 1519. It should be noted that these methods describe possible implementation, and that the operations and the steps may be rearranged or otherwise modified such that other implementations are possible. In one example, aspects from two or more of the methods may be combined. For example, aspects of each of the methods may include steps or aspects of the other methods, or other steps or techniques described herein. Thus, aspects of the disclosure may provide for receiving on transmit and transmitting on receive. The functions described herein in the flowchart of FIG. 13 may be implemented in hardware, or by software executed by a processor like the processor 1503 described in FIG. 15.

Figure 16:
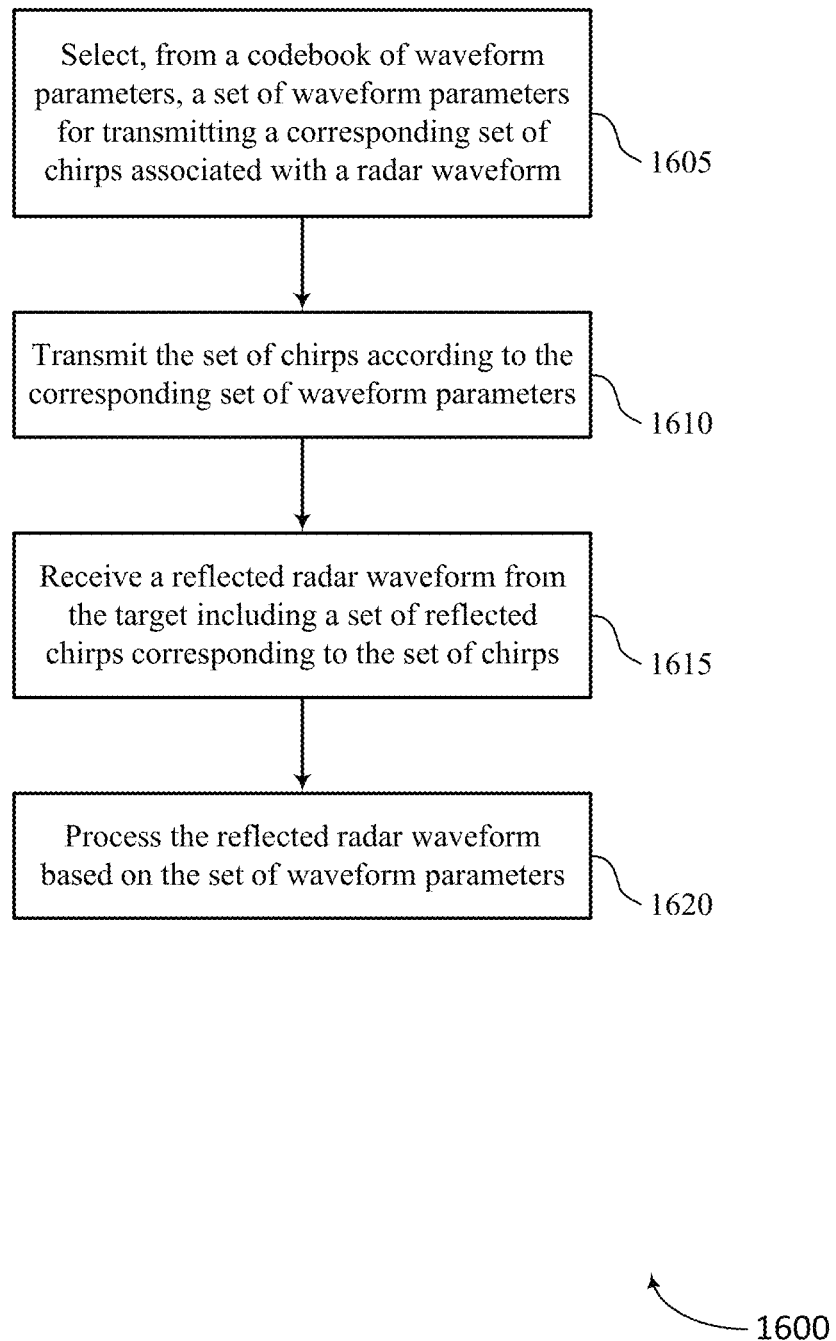
FIG. 16 shows a flowchart illustrating methods for selecting waveform parameters and processing reflected waveforms in accordance with aspects of the present disclosure.

FIG. 16 shows a flowchart illustrating a method 1600 illustrating methods for selecting waveform parameters and processing reflected waveforms in accordance with aspects of the present disclosure. The operations of method 1600 may be implemented by a UE 120 or its components as described herein. In some examples, a UE may execute a set of instructions to control the functional elements of the UE to perform the functions described below. Additionally or alternatively, a UE may perform aspects of the functions described below using special-purpose hardware.

At 1605, the UE may select, from a codebook of waveform parameters, a set of waveform parameters for transmitting a corresponding set of chirps associated with a radar waveform. The operations of 1605 may be performed according to the methods described herein. In some examples, aspects of the operations of 1605 may be implemented in hardware, software executed by a processor like the processor 1503 described in FIG. 15.

At 1610, the UE may transmit the set of chirps according to the corresponding set of waveform parameters. The operations of 1610 may be performed according to the methods described herein. In some examples, aspects of the operations of 1605 may be implemented in hardware, software executed by a processor like the processor 1503 described in FIG. 15.

At 1615, the UE may receive a reflected radar waveform from the target including a set of reflected chirps corresponding to the set of chirps. The operations of 1615 may be performed according to the methods described herein. In some examples, aspects of the operations of 1605 may be implemented in hardware, software executed by a processor like the processor 1503 described in FIG. 15.

At 1620, the UE may process the reflected radar waveform based on the set of waveform parameters. The operations of 1620 may be performed according to the methods described herein. In some examples, aspects of the operations of 1605 may be implemented in hardware, software executed by a processor like the processor 1503 described in FIG. 15.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as code division multiple access (CDMA), TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless network 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for receiving on transmit and transmitting on receive. It should be noted that these methods describe possible implementations, and that the operations and the steps may be rearranged or otherwise modified such that other implementations are possible. In one example, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for detecting a target using radar signals implemented by a user equipment (UE), comprising:
   selecting, from a codebook of waveform parameters, a plurality of waveform parameters for transmitting, within a frequency range, a corresponding plurality of chirps associated with a radar waveform, the plurality of waveform parameters comprising a plurality of pairs of waveform parameters, each pair of waveform parameters comprising a chirp slope and a frequency offset within the frequency range, wherein at least two pairs of the plurality of pairs of waveform parameters comprise different frequency offsets;
   transmitting the plurality of chirps within the frequency range according to the corresponding plurality of waveform parameters, wherein each of the plurality of chirps sweeps across the frequency range at least once during a respective chirp duration;
   receiving a reflected radar waveform from the target comprising a plurality of reflected chirps corresponding to the plurality of chirps; and
   processing the reflected radar waveform based at least in part on the plurality of waveform parameters.

2. The method according to claim 1, wherein the plurality of waveform parameters comprises at least three different waveform parameters.

3. The method according to claim 1, wherein the selecting the plurality of waveform parameters from the codebook comprises randomly selecting the plurality of waveform parameters from the codebook.

4. The method according to claim 1, wherein the transmitting the plurality of chirps within the frequency range according to the plurality of waveform parameters comprises transmitting each subsequent chirp of the plurality of chirps according to a different pair of waveform parameters than a preceding chirp of the plurality of chirps.

5. The method according to claim 1, wherein the transmitting the plurality of chirps within the frequency range according to the plurality of waveform parameters comprises:
transmitting a first chirp of the plurality of chirps according to a first pair of waveform parameters of the plurality of waveform parameters; and
transmitting, consecutively to the first chirp, a second chirp of the plurality of chirps according to a second pair of waveform parameters of the plurality of waveform parameters different than the first pair of waveform parameters.

6. The method according to claim 5, wherein the transmitting the plurality of chirps within the frequency range according to the plurality of waveform parameters further comprises:
transmitting a third chirp of the plurality of chirps according to a third pair of waveform parameters of the plurality of waveform parameters different than the second pair of waveform parameters.

7. The method according to claim 6, wherein the transmitting the third chirp comprises transmitting the third chirp consecutively to the second chirp.

8. The method according to claim 1, wherein each chirp slope depends on a corresponding first parameter and each frequency offset depends on the corresponding first parameter and a corresponding second parameter.

9. The method according to claim 8, wherein each pair of waveform parameters satisfies the following parameterization relationship:
where $\beta(m)$ is the chirp slope, $f0(m)$ is the frequency offset, $q(m)$ is the first parameter, $u(m)$ is the second parameter, B is a frequency range of each chirp of the plurality of chirps, and Tc is a time period of each chirp of the plurality of chirps.

10. The method according to claim 9, wherein:
BTc is a prime number.

11. The method according to claim 1, further comprising:
applying a phase modulation to two or more chirps of the plurality of chirps before transmitting the two or more chirps to reduce coherent addition of chirps of the plurality of chirps transmitted according to a same pair of waveform parameters.

12. The method according to claim 1, wherein each chirp of the plurality of chirps corresponds to a cycle of the radar waveform having a same constant time period Tc.

13. The method according to claim 1, wherein each reflected chirp of the plurality of reflected chirps corresponds to a transmitted chirp of the plurality of chirps and is associated with a same pair of waveform parameters as the corresponding transmitted chirp, and wherein the processing the reflected radar waveform comprises:
identifying, based at least in part on a first reflected chirp associated with a first pair of waveform parameters of the plurality of waveform parameters, a peak in a time delay dimension corresponding to a distance of the target; and
identifying, based at least in part on the first reflected chirp and a second reflected chirp associated with a second pair of waveform parameters of the plurality of waveform parameters, a peak in a Doppler dimension corresponding to the doppler of the target.

14. The method of claim 13, wherein the processing the reflected radar waveform comprises:
applying a first Fourier transform to the first reflected chirp to identify the peak in the time delay dimension; and
applying a second Fourier transform to the first reflected chirp and the second reflected chirp to identify the peak in the Doppler dimension.

15. The method according to claim 14, wherein the processing the reflected radar waveform comprises:
applying a third Fourier transform to the second reflected chirp and equalizing a first phase of the first reflected chirp and a second phase of the second reflected chirp before applying the second Fourier transform.

16. The method according to claim 15, wherein the processing the reflected radar waveform comprises:
resampling the first reflected chirp and the second reflected chirp after applying the first Fourier transform and the third Fourier transform to align outputs of the first Fourier transform and the third Fourier transform before applying the second Fourier transform.

17. The method according to claim 1, wherein the radar waveform is a frequency modulated continuous wave (FMCW) waveform.

18. The method according to claim 1, wherein the radar waveform is a phase-coded frequency modulated continuous wave (FMCW) waveform.

19. An apparatus for detecting a target using radar signals implemented by a user equipment (UE), comprising:
a processor;
memory coupled to the processor; and
instructions stored in the memory and executable by the processor to cause the apparatus to:
select, from a codebook of waveform parameters, a plurality of waveform parameters for transmitting, within a frequency range, a corresponding plurality of chirps associated with a radar waveform, the plurality of waveform parameters comprising a plurality of pairs of waveform parameters, each pair of waveform parameters comprising a chirp slope and a frequency offset within the frequency range, wherein at least two pairs of the plurality of pairs of waveform parameters comprise different frequency offsets;
transmit the plurality of chirps within the frequency range according to the corresponding plurality of waveform parameters, wherein each of the plurality of chirps sweeps across the frequency range at least once during a respective chirp duration;
receive a reflected radar waveform from the target comprising a plurality of reflected chirps corresponding to the plurality of chirps; and
process the reflected radar waveform based at least in part on the plurality of waveform parameters.

20. The apparatus of claim 19, wherein the plurality of waveform parameters comprises at least three different waveform parameters.

21. The apparatus of claim 19, wherein the instructions are further executable by the processor to cause the apparatus to:
randomly select the plurality of waveform parameters from the codebook.

22. The apparatus of claim 19, wherein the instructions are further executable by the processor to cause the apparatus to:
transmit each subsequent chirp of the plurality of chirps according to a different pair of waveform parameters than a preceding chirp of the plurality of chirps.

23. The apparatus of claim 19, wherein the instructions are further executable by the processor to cause the apparatus to:
- transmit a first chirp of the plurality of chirps according to a first pair of waveform parameters of the plurality of waveform parameters; and
- transmit, consecutively to the first chirp, a second chirp of the plurality of chirps according to a second pair of waveform parameters of the plurality of waveform parameters different than the first pair of waveform parameters.

24. The apparatus of claim 23, wherein the instructions are further executable by the processor to cause the apparatus to:
- transmit a third chirp of the plurality of chirps according to a third pair of waveform parameters of the plurality of waveform parameters different than the second pair of waveform parameters.

25. The apparatus of claim 19, wherein each reflected chirp of the plurality of reflected chirps corresponds to a transmitted chirp of the plurality of chirps and is associated with a same pair of waveform parameters as the corresponding transmitted chirp, and wherein the instructions are further executable by the processor to cause the apparatus to:
- identify, based at least in part on a first reflected chirp associated with a first pair of waveform parameters of the plurality of waveform parameters, a peak in a time delay dimension corresponding to a distance of the target; and
- identify, based at least in part on the first reflected chirp and a second reflected chirp associated with a second pair of waveform parameters of the plurality of waveform parameters, a peak in a Doppler dimension corresponding to the doppler of the target.

26. The apparatus of claim 25, wherein the instructions are further executable by the processor to cause the apparatus to:
- apply a first Fourier transform to the first reflected chirp to identify the peak in the time delay dimension; and
- apply a second Fourier transform to the first reflected chirp and the second reflected chirp to identify the peak in the Doppler dimension.

27. An apparatus for detecting a target using radar signals implemented by a user equipment (UE), comprising:
- means for selecting, from a codebook of waveform parameters, a plurality of waveform parameters for transmitting, within a frequency range, a corresponding plurality of chirps associated with a radar waveform, the plurality of waveform parameters comprising a plurality of pairs of waveform parameters, each pair of waveform parameters comprising a chirp slope and a frequency offset within the frequency range, wherein at least two pairs of the plurality of pairs of waveform parameters comprise different frequency offsets;
- means for transmitting the plurality of chirps within the frequency range according to the corresponding plurality of waveform parameters, wherein each of the plurality of chirps sweeps across the frequency range at least once during a respective chirp duration;
- means for receiving a reflected radar waveform from the target comprising a plurality of reflected chirps corresponding to the plurality of chirps; and
- means for processing the reflected radar waveform based at least in part on the plurality of waveform parameters.

28. A non-transitory computer-readable medium storing code for detecting a target using radar signals implemented by a user equipment (UE), the code comprising instructions executable by a processor to:
- select, from a codebook of waveform parameters, a plurality of waveform parameters for transmitting, within a frequency range, a corresponding plurality of chirps associated with a radar waveform, the plurality of waveform parameters comprising a plurality of pairs of waveform parameters, each pair of waveform parameters comprising a chirp slope and a frequency offset within the frequency range, wherein at least two pairs of the plurality of pairs of waveform parameters comprise different frequency offsets;
- transmit the plurality of chirps within the frequency range according to the corresponding plurality of waveform parameters, wherein each of the plurality of chirps sweeps across the frequency range at least once during a respective chirp duration;
- receive a reflected radar waveform from the target comprising a plurality of reflected chirps corresponding to the plurality of chirps; and
- process the reflected radar waveform based at least in part on the plurality of waveform parameters.

29. The apparatus of claim 19, wherein each chirp slope depends on a corresponding first parameter and each frequency offset depends on the corresponding first parameter and a corresponding second parameter.

30. The apparatus according to claim 29, wherein each pair of waveform parameters satisfies the following parameterization relationship:
- where $\beta(m)$ is the chirp slope, $f0(m)$ is the frequency offset, $q(m)$ is the first parameter, $u(m)$ is the second parameter, B is a frequency range of each chirp of the plurality of chirps, and Tc is a time period of each chirp of the plurality of chirps.

* * * * *